United States Patent
Shan et al.

(10) Patent No.: US 11,364,950 B2
(45) Date of Patent: Jun. 21, 2022

(54) STEERING CONTROL SYSTEM AND METHOD AS WELL AS CRANE

(71) Applicant: XUZHOU HEAVY MACHINERY CO., LTD., Jiangsu (CN)

(72) Inventors: Zenghai Shan, Jiangsu (CN); Jiankai Chen, Jiangsu (CN); Yunwang Ma, Jiangsu (CN); Zongjia Yu, Jiangsu (CN); Yufeng Zhao, Jiangsu (CN); Liufu Zhao, Jiangsu (CN); Pengcheng Lu, Jiangsu (CN)

(73) Assignee: XUZHOU HEAVY MACHINERY CO., LTD., Jiangsu (CN)

( * ) Notice: Subject to any disclaimer, the term of this patent is extended or adjusted under 35 U.S.C. 154(b) by 401 days.

(21) Appl. No.: 16/473,979

(22) PCT Filed: Dec. 27, 2016

(86) PCT No.: PCT/CN2016/112320
§ 371 (c)(1),
(2) Date: Jun. 26, 2019

(87) PCT Pub. No.: WO2018/119639
PCT Pub. Date: Jul. 5, 2018

(65) Prior Publication Data
US 2019/0329819 A1    Oct. 31, 2019

(51) Int. Cl.
B62D 5/12 (2006.01)
B62D 5/20 (2006.01)
B62D 6/00 (2006.01)

(52) U.S. Cl.
CPC ............. *B62D 5/12* (2013.01); *B62D 5/20* (2013.01); *B62D 6/00* (2013.01); *B62D 6/002* (2013.01)

(58) Field of Classification Search
CPC ............. B60G 11/26; B60G 2200/142; B60G 2200/44; B60G 2202/10; B60G 2206/42;
(Continued)

(56) References Cited

U.S. PATENT DOCUMENTS

| 3,933,215 A | 1/1976 | Scheuerle |
| 6,827,176 B2 * | 12/2004 | Bean ................. B60B 35/003 180/411 |
| 2009/0206570 A1 * | 8/2009 | Strong ................ B62D 61/12 280/86.5 |

FOREIGN PATENT DOCUMENTS

| CN | 201012706 Y | 1/2008 |
| CN | 201329895 Y | 10/2009 |

(Continued)

OTHER PUBLICATIONS

Supplemental European Search Report received in related European Patent Application No. 16925899, dated Jul. 9, 2020.
(Continued)

*Primary Examiner* — Hunter B Lonsberry
*Assistant Examiner* — Daniel L Greene
(74) *Attorney, Agent, or Firm* — Kilpatrick Townsend & Stockton LLP

(57) ABSTRACT

The present application discloses a steering control system, a method and a crane. The steering control system includes: one or more first angle sensors, one or more second angle sensors, and a steering controller; each of the first angle sensors collects an actual steering angle of a wheel corresponding to a mechanical steering axle as a first steering angle; each of the second angle sensors an actual steering angle of a wheel corresponding to an electrically controlled steering axle as a second steering angle; the steering controller obtains a theoretical steering angle of the wheel corresponding to the electrically controlled steering axle in a corresponding travel mode according to the first steering
(Continued)

angle, and compares the second steering angle with the theoretical steering angle, to control the wheel corresponding to the electrically controlled steering axle to steer according to a difference therebetween.

18 Claims, 14 Drawing Sheets

(58) Field of Classification Search
CPC .......... B60G 2300/36; B60G 2400/252; B60G 2400/412; B60G 3/06; B62D 15/021; B62D 5/12; B62D 5/20; B62D 6/00; B62D 7/1509
See application file for complete search history.

(56) References Cited

FOREIGN PATENT DOCUMENTS

| | | | |
|---|---|---|---|
| CN | 201907559 U | | 7/2011 |
| CN | 201941836 U | | 8/2011 |
| CN | 102390430 A | | 3/2012 |
| CN | 102514619 A | | 6/2012 |
| CN | 102730057 A | * | 10/2012 |
| CN | 203332205 U | | 12/2013 |
| CN | 103522865 A | | 1/2014 |
| CN | 103552601 A | | 2/2014 |
| CN | 103963825 A | | 8/2014 |
| CN | 204279618 U | | 4/2015 |
| CN | 105257274 A | | 1/2016 |
| CN | 201941836 U | | 8/2016 |
| JP | 61211171 A | | 9/1986 |
| WO | 2015060752 A1 | | 4/2015 |
| WO | 2015/109569 A1 | | 7/2015 |

OTHER PUBLICATIONS

International Search Report received in PCT/CN2016/112320, dated Sep. 18, 2017, 8 Pages.
First Office Action received in related Chinese Application No. 201611221792.0, dated Jul. 9, 2018, 15 Pages.
Second Office Action received in related Chinese Application No. 201611221792.0, dated Mar. 26, 2019, 26 Pages.

* cited by examiner

STEERING CONTROL SYSTEM AND METHOD AS WELL AS CRANE

CROSS-REFERENCE

The present application is a national stage of PCT/2016/112320 filed on Dec. 27, 2016, the disclosure of which is incorporated by reference herein in its entirety.

TECHNICAL FIELD

The present application relates to the field of construction machinery, in particular to a steering control system and method as well as a crane.

BACKGROUND

In order to meet client's requirements for riding comfort of an all-terrain crane, axles of the all-terrain crane have gradually transformed from original integral axles to independent suspension axles. The application of the independent suspension axles eliminates mutual influences of longitudinal movements of the left and right wheels during travel of the crane, which greatly enhances the riding comfort during travel of the all-terrain crane. At present, in order to match the independent suspension axles, an electrohydraulic axle steering system of a construction machinery vehicle is designed.

SUMMARY

According to a first aspect of the present application, a steering device is provided. The steering device comprises: a knuckle arm and a power-steering cylinder; wherein the knuckle arm is located between a suspension cylinder and an axle rim; the power-steering cylinder includes a first end connected to a frame bottom and a second end connected to the knuckle arm.

In one embodiment, the steering device further comprises: a fixing bracket; wherein the fixing bracket is fixedly connected to the frame bottom, and the first end of the power-steering cylinder is articulated with the fixing bracket; the knuckle arm is connected to the suspension cylinder and the axle rim by a bolt; the second end of the power-steering cylinder is articulated with the knuckle arm.

According to a second aspect of the present application, a suspension cylinder is provided. The suspension cylinder comprises: a cylinder rod, a cylinder barrel, a connecting rod and an angle sensor, wherein the angle sensor comprises a rotary portion and a fixing portion, in which the rotary portion is connected to the cylinder barrel, and the fixing portion is connected to the connecting rod; and the connecting rod is connected to the cylinder rod.

In one embodiment, the suspension cylinder further comprises: a displacement sensor fixedly connected to the cylinder rod and slidably connected to the connecting rod; and a rotation restricting means disposed on the connecting rod to restrict relative rotation between the displacement sensor and the connecting rod.

In one embodiment, the suspension cylinder further comprises: a bearing mounted on the cylinder barrel, wherein the rotary portion of the angle sensor is connected to the bearing.

According to a third aspect of the present application, a steering control system is provided. The steering control system comprises: one or more first angle sensors, one or more second angle sensors, and a steering controller; wherein the one or more first angle sensors and the one or more second angle sensors are respectively electrically connected to the steering controller; each of the first angle sensors collects an actual steering angle of a wheel corresponding to one of at least one mechanical steering axle as a first steering angle, and transmits the first steering angle to the steering controller; each of the second angle sensors collects an actual steering angle of a wheel corresponding to one of at least one electrically controlled steering axle as a second steering angle, and transmits the second steering angle to the steering controller; the steering controller obtains a theoretical steering angle of the wheel corresponding to the electrically controlled steering axle in a corresponding travel mode according to the first steering angle, and compares the second steering angle with the theoretical steering angle, to control the wheel corresponding to the electrically controlled steering axle to steer according to a difference therebetween, until the difference between the second steering angle and the theoretical steering angle is within a preset range.

In one embodiment, each of the first angle sensor is mounted on a first suspension cylinder corresponding to one of the at least one mechanical steering axle; each of the second angle sensor is mounted on a second suspension cylinder corresponding to one of the at least one electrically controlled steering axle.

In one embodiment, each of the first angle sensors is integrated together with the first suspension cylinder, and each of the second angle sensors is integrated together with the second suspension cylinder; wherein each of the first angle sensors includes a first rotary portion connected to a cylinder barrel of the corresponding first suspension cylinder and a first fixing portion connected to a connecting rod of the corresponding first suspension cylinder; each of the second angle sensor comprises a second rotary portion connected to a cylinder barrel of the corresponding second suspension cylinder and a second fixing portion, connected to a connecting rod of the corresponding second suspension cylinder.

In one embodiment, the at least one mechanical steering axle is an independent mechanical axle, and the at least one electrically controlled steering axle is an independent electrically controlled axle; each of a portion of the first angle sensors is mounted respectively on a suspension cylinder on the left side of the independent mechanical axle to collect the first steering angle on the left side, each of another portion of the first angle sensors is mounted respectively on a suspension cylinder on the right side of the independent mechanical axle to collect the first steering angle on the right side, and each of a portion of the second angle sensors is mounted respectively on a suspension cylinder on the left side of the independent mechanical axle to collect the second steering angle on the left side and each of another portion of the second angle sensors is mounted respectively on a suspension cylinder on the right side of the independent electrically controlled axle to collect the second steering angle on the right side; wherein the steering controller obtains the theoretical steering angle of the wheel on the left side of the electrically controlled steering axle in the corresponding travel mode according to the first steering angle on the left side, and compares the second steering angle with the theoretical steering angle of the wheel on the left side of the electrically controlled steering axle, to control the wheel on the left side of the electrically controlled steering axle to steer, and obtains the theoretical steering angle of the wheel on the right side of the electrically controlled steering axle in the corresponding travel mode according to the first steering angle on the right side, and compares the second steering angle with the theoretical steering angle of the wheel on the right side of the electrically controlled steering axle to control the wheel on the right side of the electrically controlled steering axle to steer.

In one embodiment, the steering controller calculates the theoretical steering angle of the wheel corresponding to the electrically controlled steering axle in the corresponding travel mode according to Ackerman's theorem; wherein the travel mode comprises: a normal road travel mode, a small turning travel mode, a crab-like travel mode, a tail slide preventing travel mode, a rear axle independent steering travel mode, or a rear axle locking travel mode.

In one embodiment, the at least one mechanical steering axle comprises: a first mechanical steering axle and a second mechanical steering axle; one of the first angle sensors collects the first steering angle of a first wheel connected to the first mechanical steering, and another one of the first angle sensors collects the first steering angle of a second wheel connected to the second mechanical steering; wherein the steering controller determines whether the first steering angle of the first wheel is correct according to an Ackerman theorem relationship between the first steering angle of the first wheel and the first steering angle of the second wheel as well as the first steering angle of the second wheel, and calculates the theoretical steering angle of the wheel corresponding to the electrically controlled steering axle in the corresponding travel mode according to the first steering angle of the first wheel if the first steering angle of the first wheel is correct.

In one embodiment, the steering control system further comprises: a steering hydraulic system for controlling an action of a steering device of the wheel corresponding to the electrically controlled steering axle by hydraulic oil after receiving a steering electrical signal of the steering controller, thereby controlling the wheel corresponding to the electrically controlled steering axle to steer; wherein the steering controller transmits the steering electrical signal to the steering hydraulic system according to the difference between the second steering angle and the theoretical steering angle.

In one embodiment, the steering device comprises: a knuckle arm and a power-steering cylinder; wherein the knuckle arm is located between a suspension cylinder and an axle rim; the power-steering cylinder includes a first end connected to a frame bottom and a second end connected to the knuckle arm.

In one embodiment, the steering hydraulic system comprises: a hydraulic pump, a hydraulic oil tank, at least one directional solenoid valve block, and at least one latch valve block for locking oil chambers; wherein the steering controller is electrically connected to the directional solenoid valve block and the latch valve block respectively, the directional solenoid valve block is respectively connected to the hydraulic pump, the hydraulic oil tank and the corresponding latch valve block through an oil passage, the hydraulic pump is connected to the hydraulic oil tank through an oil passage, and the latch valve block is connected to an oil chamber of a power-steering cylinder of the steering device through an oil passage; the steering controller transmits the steering electrical signal to the corresponding directional solenoid valve block and the corresponding latch valve block according to the difference between the second steering angle and the theoretical steering angle respectively, so that the oil passage of the directional solenoid valve block communicates with oil passage of the corresponding latch valve block, thereby controlling a projecting or retracting action of the corresponding power-steering cylinder, to control the corresponding wheel to steer.

In one embodiment, the steering control system further comprises: a vehicle speed detecting device for obtaining a vehicle speed and transmitting the vehicle speed to the steering controller, wherein the steering controller adjusts the steering angle of the wheel corresponding to the electrically controlled steering axle in conjunction with the vehicle speed.

In one embodiment, the steering control system further comprises: at least one position detecting switch or at least one displacement sensor; each of the at least one position detecting switch disposed on the power-steering cylinder of the corresponding steering device, for detecting a position of a piston in the power-steering cylinder and transmitting the position of the piston to the steering controller; wherein the steering controller determines whether the power-steering cylinder is in a neutral position according to the position of the piston, and controls movement of the piston when the steering cylinder is not in the neutral position, such that the power-steering cylinder is in the neutral position; each of the at least one displacement sensor disposed on the power-steering cylinder of the corresponding steering device, for detecting a displacement of a piston in the power-steering cylinder and transmitting the displacement to the steering controller; wherein the steering controller determines whether the power-steering cylinder is in a neutral position according to the displacement, and controls movement of the piston when the steering cylinder is not in the neutral position, so that the power-steering cylinder is in the neutral position; wherein, the power-steering cylinder in the neutral position refers to that the steering angle of the corresponding wheel is zero.

In one embodiment, the steering controller is further configured to lock a position of the piston after the power-steering cylinder is in the neutral position, and to perform an automatic zeroing operation of the corresponding first angle sensor and the corresponding second angle after adjusting positioning parameters of the corresponding wheel.

According to a fourth aspect of the present application, an auxiliary emergency control system is provided. The auxiliary emergency control system comprises: an auxiliary controller electrically connected to a steering controller, for reading a signal of the steering controller, and transmitting an emergency electrical signal to an auxiliary hydraulic system when the steering controller is malfunctioned or a steering hydraulic system corresponding to the steering controller is malfunctioned; and the auxiliary hydraulic system, configured to control an action of a power-steering cylinder of a steering device of a corresponding wheel by hydraulic oil when the emergency electrical signal is received, so that the wheel returns to a neutral position.

In one embodiment, the auxiliary hydraulic system comprises: a transfer case, an auxiliary emergency pump and a plurality of auxiliary control solenoid valves; the auxiliary emergency pump is mounted on the transfer case, the auxiliary emergency pump is connected to a hydraulic oil tank through an oil passage, and connected to the plurality of auxiliary control solenoid valves through oil passages; each of the auxiliary control solenoid valves is respectively connected to a large chamber and a small chamber of the corresponding power-steering cylinder through an oil passage; the auxiliary controller is electrically connected to the plurality of auxiliary control solenoid valves; wherein the auxiliary controller transmits the emergency electrical signal to the auxiliary control solenoid valves to control conduction of the auxiliary control solenoid valves, thereby controlling an action of the corresponding power-steering cylinder.

In one embodiment, the auxiliary emergency control system further comprises: a position detecting switch disposed on the power-steering cylinder, for detecting a position of a piston in the power-steering cylinder and transmitting the position of the piston to the auxiliary controller; wherein the auxiliary controller when collecting that the power-steering cylinder returns to a neutral position according to the position of the piston determines that the wheel returns to the neutral position, thereby ceasing control of an action of the power-steering cylinder.

In one embodiment, the auxiliary emergency control system further comprises: a cylinder displacement sensor disposed on the power-steering cylinder, for detecting a displacement of the power-steering cylinder and transmitting the displacement to the auxiliary controller; wherein the auxiliary controller when collecting that the power-steering cylinder returns to a neutral position according to the displacement determines that the wheel returns to the neutral position, thereby ceasing control of an action of the power-steering cylinder.

In one embodiment, the auxiliary emergency control system further comprises: an on-off solenoid valve and a priority valve; the on-off solenoid valve is electrically connected to the auxiliary controller; the on-off solenoid valve is connected to the auxiliary emergency pump through an oil passage, and connected to the priority valve through an oil passage; the priority valve is connected to a steering hydraulic system corresponding to a mechanical steering axle through an oil passage; wherein when an electrically controlled steering axle of the vehicle is malfunctioned, the auxiliary controller transmits a conduction signal to the on-off solenoid valve and the priority valve, and controls conduction of the on-off solenoid valve and the priority valve, thereby controlling steering of a wheel corresponding to a mechanical steering axle.

In one embodiment, the auxiliary controller after receiving the displacement calculates a current steering angle of the wheel according to the displacement, and controls the wheel to steer in conjunction with the current steering angle when the steering control system of the vehicle is malfunctioned.

According to a fifth aspect of the present application, a crane is provided. The crane comprises: the steering control system as previously described.

In one embodiment, the crane further comprises the auxiliary emergency control system as previously described.

According to a sixth aspect of the present application, a steering control method is provided. The steering control method comprises: collecting an actual steering angle of each of at least one wheel corresponding to one of at least one mechanical steering axle as a first steering angle; and collecting an actual steering angle of each of at least one wheel corresponding to one of at least one electrically controlled steering axle as a second steering angle; and obtaining a theoretical steering angle of the wheel corresponding to the electrically controlled steering axle in a corresponding travel mode according to the first steering angle, and comparing the second steering angle with the theoretical steering angle, to control the wheel corresponding to the electrically controlled steering axle to steer according to a difference therebetween until the difference between the second steering angle and the theoretical steering angle is within a preset range.

In one embodiment, the at least one mechanical steering axle is an independent mechanical axle, and the at least one electrically controlled steering axle is an independent electrically controlled axle; the collecting an actual steering angle of each of at least one wheel corresponding to one of at least one mechanical steering axle as a first steering angle; and collecting an actual steering angle of each of at least one wheel corresponding to one of at least one electrically controlled steering axle as a second steering angle comprises: collecting the first steering angle of the wheel on each of the left and right sides of the independent mechanical axle and the second steering angle of the wheel on each of the left and right sides of the independent electrically controlled axle; the obtaining a theoretical steering angle of the wheel corresponding to the electrically controlled steering axle in a corresponding travel mode according to the first steering angle, and comparing the second steering angle with the theoretical steering angle to control the wheel corresponding to the electrically controlled steering axle to steer comprises: obtaining the theoretical steering angle of the wheel on the left side of the electrically controlled steering axle in the corresponding travel mode according to the first steering angle of the wheel on the left side of the independent mechanical axle, and comparing the second steering angle with the theoretical steering angle of the wheel on the left side of the electrically controlled steering axle, to control the wheel on the left side of the electrically controlled steering axle to steer; and obtaining the theoretical steering angle of the wheel on the right side of the electrically controlled steering axle in the corresponding travel mode according to the first steering angle of the wheel on the right side of the independent mechanical axle, and comparing the second steering angle with the theoretical steering angle of the wheel on the right side of the electrically controlled steering axle, to control the wheel on the right side of the electrically controlled steering axle to steer.

In one embodiment, the obtaining the theoretical steering angle of the wheel corresponding to the electrically controlled steering axle in a corresponding travel mode comprises: calculating the theoretical steering angle of the wheel corresponding to the electrically controlled steering axle in a corresponding travel mode according to the Ackerman's theorem; wherein the travel mode includes: at least one of a normal road travel mode, a small turning travel mode, a crab-like travel mode, a tail slide preventing travel mode, a rear axle independent steering travel mode, or a rear axle locking travel mode.

In one embodiment, the wheel corresponding to the mechanical steering axle comprises: a first wheel corresponding to a first mechanical steering axle and a second wheel corresponding to a second mechanical steering axle; the wheel corresponding to the electrically controlled steering axle comprises: a third wheel corresponding to a third electrically controlled steering axle, a fourth wheel corresponding to a fourth electrically controlled steering axle, and a fifth wheel corresponding to a fifth electrically controlled steering axle, and a sixth wheel corresponding to a sixth electrically controlled steering axle and a seventh wheel corresponding to a seventh electrically controlled steering axle.

In one embodiment, in the normal road travel mode, the steering directions of the fifth wheel, the sixth wheel, and the seventh wheel are opposite to those of the first wheel, the second wheel, and the third wheel and the fourth wheel, and the steering angles of the first wheel to the seventh wheel satisfy the Ackerman theorem.

In one embodiment, in the small turning travel mode, the steering directions of the fifth wheel, the sixth wheel, and the seventh wheel are opposite to the first wheel, the second wheel, and the third wheel and the fourth wheel, and the steering angles of the first wheel to the seventh wheel satisfy the Ackerman theorem.

In one embodiment, in the crab-like travel mode, the steering directions of the first wheel to the seventh wheel are the same, and the steering angles of the first wheel and the second wheel satisfy the Ackerman theorem.

In one embodiment, in the tail slide preventing travel mode, the steering directions of the seventh wheel are opposite to the steering directions of the first wheel, the second wheel, the third wheel, and the fourth wheel, the fifth wheel and the sixth wheel do not take part in steering, and the steering angles of the first wheel, the second wheel, the third wheel, the fourth wheel, and the seventh wheel satisfy the Ackermann theorem.

In one embodiment, in the rear axle independent steering travel mode, the steering directions of the fifth wheel, the sixth wheel, and the seventh wheel are opposite to those of the third wheel and the fourth wheel, the first wheel and the second wheel do not take part in steering, and the steering angles of the third wheel to the seventh wheel satisfy the Ackerman theorem; wherein the step of obtaining the theoretical steering angle comprises: obtaining a steering angle of a knob of a vehicle and a vertical distance from the knob to a steering center; and calculating the theoretical steering angles of the third wheel to the seventh wheel in conjunction with the steering angle of the knob and the vertical distance.

In one embodiment, in the rear axle locking travel mode, the third wheel to the seventh wheel do not take part in steering, and the steering angles of the first wheel and the second wheel satisfy the Ackerman theorem.

In one embodiment, the first steering angle comprise: a steering angle of the first wheel and a steering angle of the second wheel; the step of obtaining the theoretical steering angle comprises: determining whether the steering angle of the first wheel is correct according to the Ackerman theorem relationship between the steering angle of the first wheel and the steering angle of the second wheel as well as the steering angle of the second wheel; and calculating the theoretical steering angle of the wheel corresponding to the electrically controlled steering axle in the corresponding travel mode according to the steering angle of the first wheel if the steering angle of the first wheel is correct.

In one embodiment, the controlling the wheel corresponding to the electrically controlled steering axle to steer according to a difference therebetween comprises: transmitting a steering electrical signal to a steering hydraulic system according to the difference between the second steering angle and the theoretical steering angle; and controlling an action of a steering means of the wheel corresponding to the electrically controlled steering axle by hydraulic oil so as to control the wheel corresponding to the electrically controlled steering axle to steer after the steering hydraulic system receives the steering electrical signal.

In one embodiment, the method further comprises: obtaining a vehicle speed; and adjusting a steering angle of the wheel corresponding to the electrically controlled steering axle in conjunction with the vehicle speed.

In one embodiment, the method further comprises: detecting a position of a piston in a power-steering cylinder; and determining whether the power-steering cylinder is in a neutral position according to the position of the piston, and controlling a movement of the piston when the steering cylinder is not in the neutral position, such that the power-steering cylinder is in the neutral position; wherein, the power-steering cylinder in the neutral position refers to that the steering angle of the corresponding wheel is zero.

In one embodiment, the method further comprises: locking a position of the piston after the power-steering cylinder is in the neutral position; adjusting positioning parameters of a wheel corresponding to the power-steering cylinder; and performing an automatic zeroing operation of the collected first steering angle and the second steering angle.

Other features of the present application and advantages thereof will become explicit by means of the following detailed descriptions of the exemplary embodiments of the present application with reference to the accompanying drawings.

BRIEF DESCRIPTION OF THE DRAWINGS

The accompanying drawings, which constitute part of this specification, illustrate exemplary embodiments of the present application and, together with this specification, serve to explain the principles of the present application.

The present application may be more clearly understood from the following detailed description with reference to the accompanying drawings, in which.

DETAILED DESCRIPTION

Figure 1:
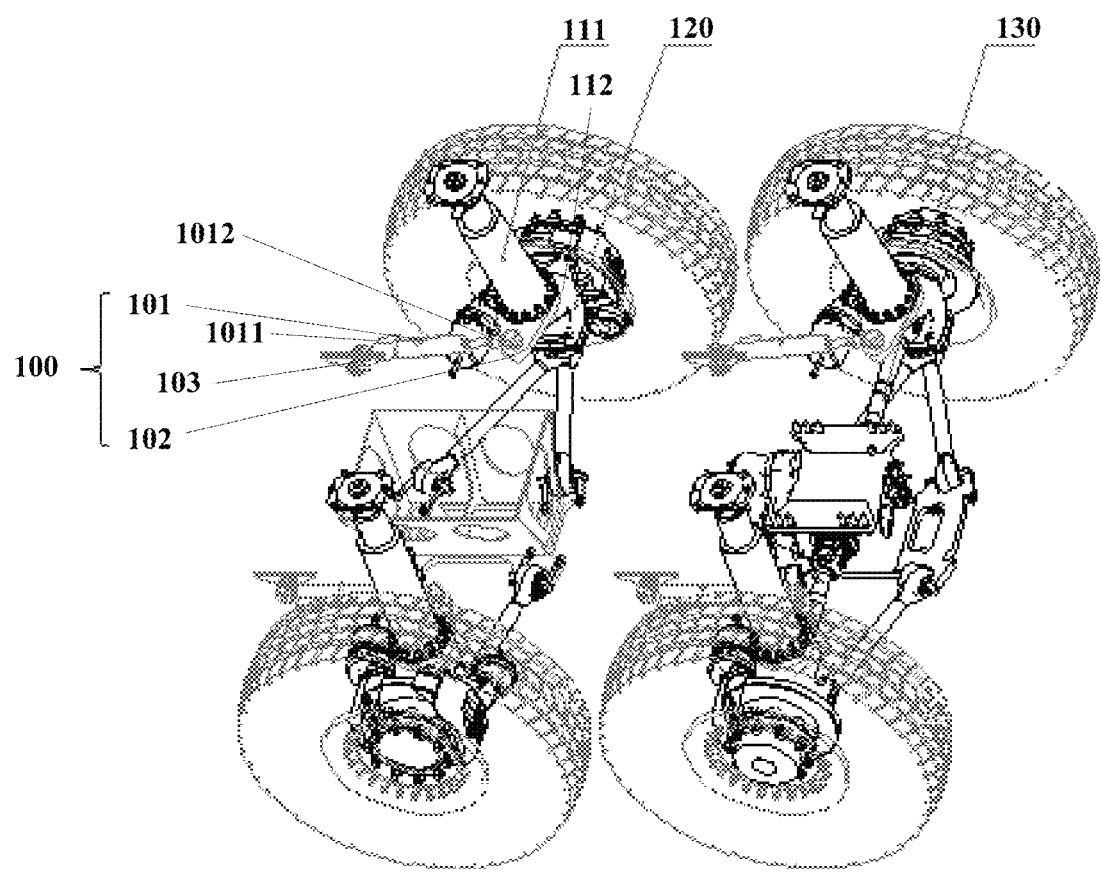
FIG. 1 is a schematic structural view schematically showing a steering device according to one embodiment of the present application.

The present application relates to the field of construction machinery, in particular to a steering device, a suspension cylinder, a control system and method as well as a crane.

Various exemplary embodiments of the present application will now be described in detail with reference to the accompanying drawings. It should be noted that: unless additionally specified, the relative arrangements, numerical expressions and numerical values of the components and steps expounded in these examples do not limit the scope of the present application.

At the same time, it should be understood that, in order to facilitate the description, the dimensions of various parts shown in the drawings are not delineated according to actual proportional relations.

The following descriptions of at least one exemplary embodiment which are in fact merely illustrative, by no means serve as any delimitation on the present application as well as its application or use.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as delimitation. Thus, other examples of exemplary embodiments may have different values.

It should be noted that similar reference signs and letters present similar items in the following drawings, and therefore, once an item is defined in a drawing, there is no need for further discussion in the subsequent drawings.

The inventors have found that the current steering system has the following defects:

(1) The steering mechanism of the steering system includes a transition rocker arm, a trapezoidal arm, a steering lever, and the like, which causes the steering mechanism to be too heavy.

(2) The data of a rotary angle of the tire which is indirectly obtained by using a fitting tool, after measuring a rotary angle of the steering arm has a poor accuracy.

(3) The left and right side wheel tires have a fixed rotary angle relationship. During a shift between different steering modes, due to an inadequate rotary angle or an excessive rotary angle arising from a change in a rotary angle of a tire that is theoretically designed, it is likely to cause abnormal wear of the tire.

(4) The four-wheel positioning of the independent suspension axle is difficult. Due to the complicated connection of the trapezoidal mechanism in the steering mechanism, when the four-wheel positioning is performed, the neutral state of the theoretical design cannot be accurately found, which causes that the four-wheel positioning is difficult.

The inventors of the present application have found the above problems in the above prior art, and thus provide a new technical solution to at least one of the problems.

FIG. 1 is a schematic structural view schematically showing a steering device according to one embodiment of the present application. FIG. 1 illustrates a disconnected non-driving axle 120 and a disconnected driving axle 130, and each of the axles is connected to a frame (not shown in FIG. 1) by two suspension cylinders 111. The top of a cylinder rod of each of the suspension cylinders 111 is connected to the frame, and the bottom of a cylinder barrel of each of the suspension cylinders 111 is connected to one of at least one axle rim 112. During the steering movement, the cylinder rod may be without rotation relative to the frame, and the axle rim 112 drives the cylinder barrel to rotate.

As shown in FIG. 1, each of at least one steering device 100 may comprise a knuckle arm 102 and a power-steering cylinder (a cylinder that provides a power-steering effect for a wheel) 101. The knuckle arm 102 is located between one of the suspension cylinders 111 and the corresponding axle rim 112. For example, as shown in FIG. 1, the knuckle arm 102 may be connected to the suspension cylinder 111 and the axle rim 112 (e.g., a steering knuckle on the axle rim) by bolts. The power-steering cylinder 101 may include a first end 1011 and a second end 1012. The first end 1011 is connected to the bottom of the frame (not shown in FIG. 1). The second end 1012 is connected to the knuckle arm 102. For example, as shown in FIG. 1, the second end 1012 of the power-steering cylinder may be articulated with the knuckle arm 102.

In one embodiment, as shown in FIG. 1, each of the at least one steering device 100 may further comprise: a fixing bracket 103. The fixing bracket 103 may be fixedly connected to the bottom of the frame, and the first end 1011 of the power-steering cylinder 101 of the steering device 100 may be articulated with the fixing bracket 103.

In this embodiment, during the steering movements of the tires on the axles, the power comes from the power-steering cylinders connected to the axle rims, and each of the power-steering cylinders converts a telescopic movement of the cylinder into a rotation of the tire in a hydraulic assisting form. Each of the steering devices of the embodiment of the present application has a simple structure and a light weight, and is easy to operate. The steering device of the present application which may be applied to a chassis of a construction machinery vehicle, may significantly reduce the weight of the components in the steering system of the vehicle, and makes a significant contribution to the lightweight design of the whole vehicle.

In some embodiments of the present application, the knuckle arm may be mounted respectively on each of the left and right steering knuckles on the axle rim, and two fixing brackets are mounted on the lower bottom surface of the frame that fixes the independent suspension axle. The power-steering cylinder which is provided between the fixing bracket and the knuckle arm on the same side is articulatedly connected to the fixing bracket, and the power-steering cylinder is articulatedly connected to the knuckle arm. An oil pressure is provided to the power-steering cylinder by a hydraulic oil pump, and a steering angle of a single-side wheel is controlled by controlling a stroke displacement of a piston of the power-steering cylinder, thereby realizing the independent steering function of the single-side wheel of the independent suspension axle. The upward, downward, leftward, rightward, forward and backward directions are defined with reference to the traveling direction of the vehicle.

Figure 2:
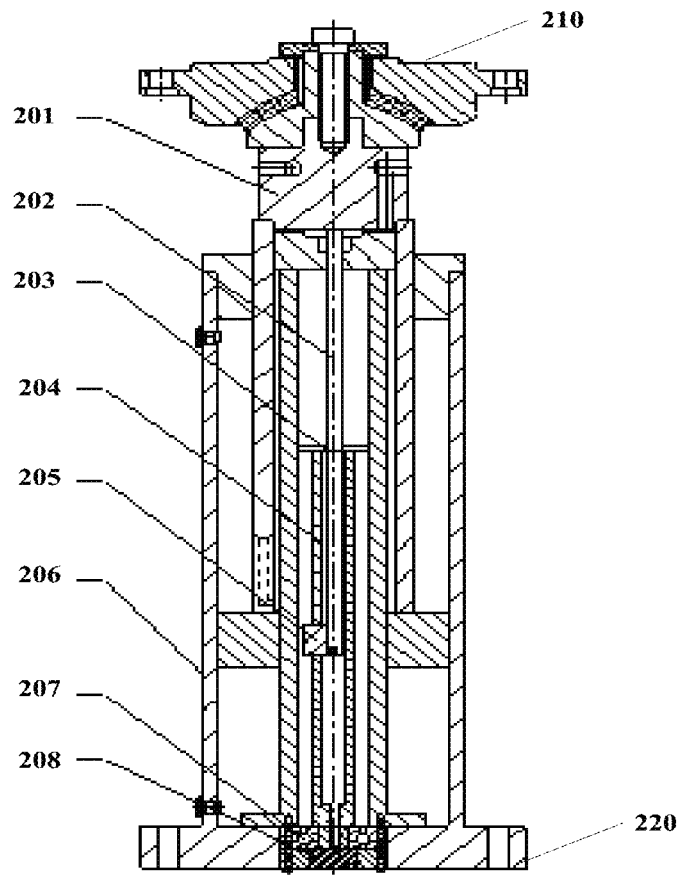
FIG. 2 is a schematic structural view showing a suspension cylinder according to one embodiment of the present application.

FIG. 2 is a schematic structural view showing a suspension cylinder according to one embodiment of the present application. As mentioned in the foregoing, an upper end 210 of each of the suspension cylinders may be connected to the frame, and a bottom 220 may be connected to the axle rim which may drive rotation of the cylinder barrel along an axial of the cylinder rod.

As shown in FIG. 2, the suspension cylinder may include a cylinder rod 201, a cylinder barrel 206, a connecting rod 204, and an angle sensor 208. The angle sensor 208 may include a rotary portion and a fixing portion. For example, the rotary portion may be connected to the cylinder barrel 206, and the fixing portion may be connected to the connecting rod 204. The connecting rod 204 may be connected to the cylinder rod 201. In one embodiment, the suspension cylinder may also include a bearing 207. The bearing 207 is mounted on the cylinder barrel 206. The rotary portion of the angle sensor 208 is connected to the bearing 207.

In one embodiment, as shown in FIG. 2, the suspension cylinder may also include a displacement sensor 202. The displacement sensor 202 is fixedly connected to the cylinder rod 201. Moreover, the displacement sensor 202 (e.g., by a rod of a displacement sensor) may be slidably (e.g., slidably up and down) connected to the connecting rod 204. In addition, a magnetic induction block 203 of the displacement sensor 202 is also shown in FIG. 2.

In one embodiment, as shown in FIG. 2, the suspension cylinder may also include a rotation restricting means 205. The rotation restricting means 205 may be disposed on the connecting rod 204 to restrict relative rotation between the displacement sensor 202 and the connecting rod 204. For example, a threaded counterbore is provided at the bottom of the rod of the displacement sensor 202, and the rotation restricting means 205 is mounted on the connecting rod 204. The rotation restricting means 205 may be in a spline-like connection mode or of other connection modes. Thus, one end (i.e., the fixing portion) of the angle sensor 208 mounted below is retained together with the rotation restricting means 205 through the center portion of the bearing 207, and the other end (i.e., the rotary portion) of the angle sensor 208 is mounted on the cylinder barrel, following the tire to rotate together, so as to detect a tire angle.

In the above embodiment, FIG. 2 shows the suspension cylinder with the displacement sensor and the angle sensor, which may detect a displacement of a piston of the cylinder and a steering angle of the tire. However, during the use of the vehicle, sometimes it may not be necessary to have each of the suspension cylinders with one displacement sensor. Therefore, by replacing the rod of the displacement sensor 202 with an iron rod and removing the magnetic induction block 203 of the displacement sensor here, it is possible to get another suspension cylinder without displacement detection, but a steering angle of the wheel can be detected.

The suspension cylinder of the embodiments of the present application effectuates detecting a rotation motion between the cylinder barrel and the cylinder rod by means of the angle sensor, and may directly acquire the tire steering angle, thereby solving the problem that indirect acquisition of the tire steering angle leads to poor precision.

Figure 3:
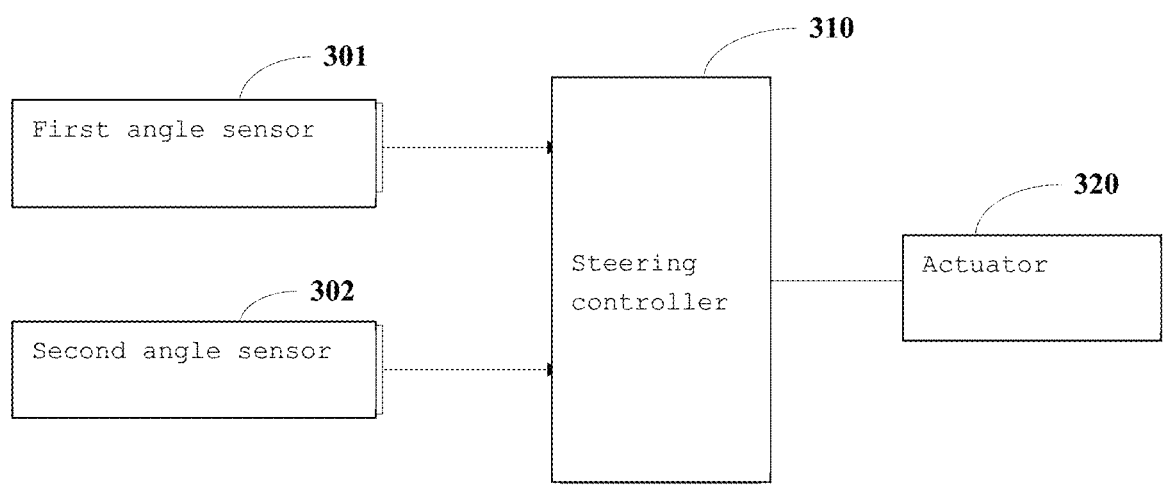
FIG. 3 is a schematic structural view schematically showing a steering control system according to one embodiment of the present application.

FIG. 3 is a schematic structural view schematically showing a steering control system according to one embodiment of the present application. As shown in FIG. 3, the steering control system may comprise one or more first angle sensors 301, one or more second angle sensors 302, and a steering controller 310. Each of the first angle sensors 301 and each of the second angle sensors 302 are respectively electrically connected to the steering controller 310. The steering control system may be applied to a vehicle having at least one mechanical steering axle and at least one electrically controlled steering axle. In addition, at least one actuator 320 is also shown in FIG. 3.

Each of the first angle sensors 301 may collect an actual steering angle of a wheel corresponding to one of the at least one mechanical steering axle as a first steering angle, and transmits the first steering angle to the steering controller 310. One first angle sensors 301 may correspond to one wheel.

Each of the second angle sensors 302 may collect an actual steering angle of a wheel corresponding to one of the at least one electrically controlled steering axle as a second steering angle, and transmits the second steering angle to the steering controller 310. One second angle sensors 302 may correspond to one wheel.

The steering controller 310 may obtain a theoretical steering angle of the wheel corresponding to the electrically controlled steering axle in a corresponding travel mode according to the first steering angle, and compares the second steering angle with the theoretical steering angle, to control the wheel corresponding to the electrically controlled steering axle according to a difference therebetween, until the difference between the second steering angle and the theoretical steering angle is within a preset range. For example, the steering controller 310 transmits a steering electrical signal to the actuator 320 in real time, to control the steering of the corresponding wheel, and the second angle sensor collects the second steering angle in real time and transmits it to the steering controller, which judges in real time or periodically whether the difference between the second steering angle and the theoretical steering angle is within a preset range, such as to cease the steering of the wheel until the difference therebetween is within the preset range. The above embodiment provides the steering control system that achieves the purpose of controlling the wheel steering.

In one embodiment, each of the first angle sensors 301 may be mounted on a corresponding first suspension cylinder corresponding to one of the at least one mechanical steering axle (here, the suspension cylinder mounted on the mechanical steering axle is referred to as a first suspension cylinder). The second angle sensor 302 is mounted on a corresponding second suspension cylinder corresponding to one of the at least one electrically controlled steering axle (here, the suspension cylinder mounted on the electrically controlled steering axle is referred to as a second suspension cylinder). For example, the first angle sensor 301 is integrated together with the corresponding first suspension cylinder, and the second angle sensor 302 is integrated together with the corresponding second suspension cylinder. The device formed by integration may be referred to as shown in FIG. 2. Alternatively, since the suspension cylinder shown in FIG. 2 includes an angle sensor, a plurality of suspension cylinders as shown in FIG. 2 may be disposed on a plurality of mechanical steering axles or a plurality of electrically controlled steering axles respectively, and the angle sensors of these suspension cylinders are respectively used as the first angle sensors or the second angle sensors.

In one embodiment, each of the first angle sensors includes a first rotary portion and a first fixing portion. The first rotary portion is connected to a cylinder barrel of the corresponding first suspension cylinder, and the first fixing portion is connected to a connecting rod of the corresponding first suspension cylinder. In another embodiment, the second angle sensor includes a second rotary portion and a second fixing portion. The second rotary portion is connected to a cylinder barrel of the corresponding second suspension cylinder, and the second fixing portion is connected to a connecting rod of the corresponding second suspension cylinder.

In one embodiment, the at least one mechanical steering axle is an independent mechanical axle, and the at least one electrically controlled steering axle is an independent electrically controlled axle. That is, the mechanical steering axle and the electrically controlled steering axle are independent axles. The independent axle is absent with a rigid beam or a non-disconnected axle connection between the left and right wheels. The left and right wheels are "independently" connected to the frame or body or constitute a disconnected axle respectively. The first angle sensors are mounted respectively on the suspension cylinders on the left and right sides of the independent mechanical axle. That is, for the wheels corresponding to the left and right sides of the independent mechanical axle, one of the first angle sensors may be individually provided to measure each of the steering angles of the left and right wheels respectively. The second angle sensors are mounted respectively on the suspension cylinders on the left and right sides of the independent electrically controlled axle. That is, for the wheels corresponding to the left and right sides of the independent electrically controlled axle, one second angle sensor may be individually provided to measure each of the steering angles of the left and right wheels respectively. The steering controller respectively controls the steering of the wheels on the left and right sides of the independent electrically controlled axle according to the first steering angles and the second steering angles. This embodiment achieves respective independent steering control of each of the wheels on different sides of the electrically controlled steering axle.

Figure 4:
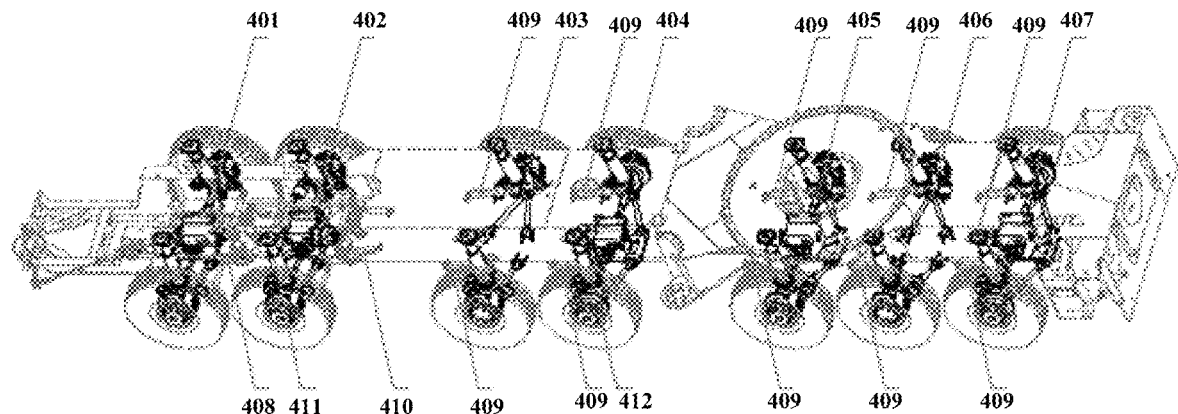
FIG. 4 is a schematic view showing a bottom of a vehicle mounted with a steering system according to one embodiment of the present application.

FIG. 4 is a schematic view showing a bottom of a vehicle mounted with a steering system according to one embodiment of the present application. The vehicle has seven axles at the bottom, which respectively consist in a first mechanical steering axle 401, a second mechanical steering axle 402, a third electrically controlled steering axle 403, a fourth electrically controlled steering axle 404, a fifth electrically controlled steering axle 405, and a sixth electrically controlled steering axle 406 and a seventh electrically controlled steering axle 407. The bottom of the vehicle having a seven-axle structure shown in FIG. 4 will be described below as an example.

In one embodiment, as shown in FIG. 4, the at least one mechanical steering axle described in the foregoing may include: the first mechanical steering axle (hereinafter referred to as a first axle) 401 and the second mechanical steering axle (hereinafter referred to as a second axle) 402. The wheels corresponding to the at least one mechanical steering axle may include: first wheels corresponding to the first mechanical steering axle 401 and second wheels corresponding to the second mechanical steering axle 402. In one embodiment, as shown in FIG. 4, the at least one electrically controlled steering axle described above may include: the third electrically controlled steering axle (hereinafter referred to as a third axle) 403 and the fourth electrically controlled steering axle (hereinafter referred to as a fourth axle) 404, the fifth electrically controlled steering axle (hereinafter referred to as the fifth axle) 405, the sixth electrically controlled steering axle (hereinafter referred to as the sixth axle) 406, and the seventh electrically controlled steering axle (hereinafter referred to as the seventh axle) 407. The wheels corresponding to the at least one electrically controlled steering axle may include: third wheels corresponding to the third electrically controlled steering axle 403, fourth wheels corresponding to the fourth electrically controlled steering axle 404, and fifth wheels corresponding to the fifth electrically controlled steering axle 405, and sixth wheels corresponding to the sixth electrically controlled steering axle 406 and seventh wheels corresponding to the seventh electrically controlled steering axle 407.

As shown in FIG. 4, the third axle 403, the fourth axle 404, the fifth axle 405, the sixth axle 406, and the seventh axle 407 may each take the form of the axle structure shown in FIG. 1. The steering device mounted on each of these axles may employ the steering device shown in FIG. 1. The structure of the steering device has been previously described in detail and will not be described again. For example, the power-steering cylinders 409 of the steering devices are shown in FIG. 4. In addition, FIG. 4 also shows at least one mechanical steering system 408 and at least one mechanical steering cylinder 410. The mechanical steering system 408 and the mechanical steering cylinder 410 may employ anyone of the existing steering systems and anyone of the existing cylinders. Also shown in FIG. 4 are the suspension cylinders, such as the suspension cylinder with a displacement sensor and an angle sensor (the structure thereof may be referred to as shown in FIG. 2) 411, the suspension cylinder 412 with an angle sensor, and the like.

The tires of the first axle 401 and the tires of the second axle 402 are connected together by a mechanical tie rod, and then the tires are rotated by a hydraulic assisting manner. Each of the suspension cylinder on the right side of the first axle and the suspension cylinder on the right side of the second axle is provided with an angular sensor.

In one embodiment, the first steering angles may include: steering angles of the first wheels and steering angles of the second wheels. The steering controller (not shown in FIG. 4) may determine whether the steering angles of the first wheels are correct according to an Ackerman theorem relationship between the steering angles of the first wheels and the steering angles of the second wheels as well as the steering angles of the second wheels, such as to calculate the theoretical steering angles of the wheels corresponding to the electrically controlled steering axles (for example the third axle to the seventh axle) in a corresponding travel mode according to at least one of the steering angles of the first wheels if the steering angles of the first wheels are correct.

In one embodiment, the steering controller may calculate the theoretical steering angle of the wheel corresponding to the electrically controlled steering axle in a corresponding travel mode according to Ackerman's theorem. In one embodiment, the travel mode may include: a normal road travel mode, a small turning travel mode, a crab-like travel mode, a tail slide preventing travel mode, a rear axle independent steering travel mode, or a rear axle locking travel mode. The steering conditions in these six travel modes will be described in detail later.

Figure 5:
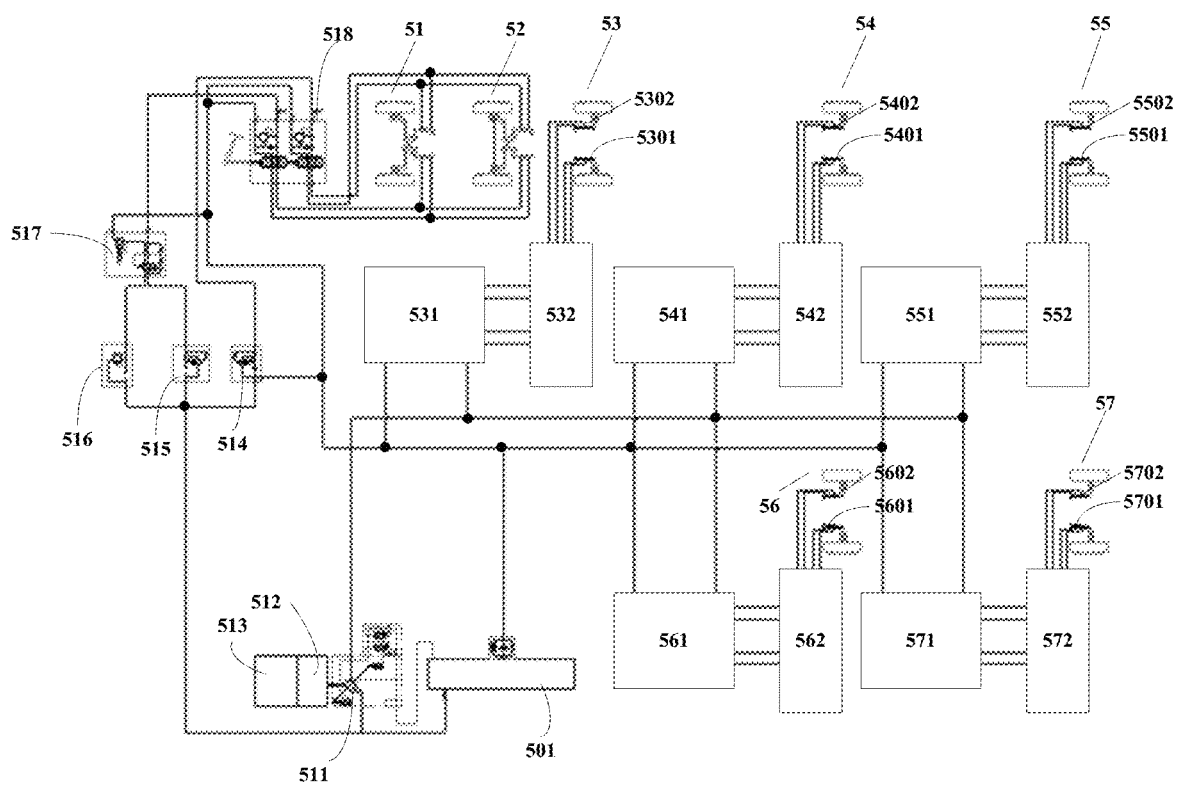
FIG. 5 is a schematic structural view schematically showing a hydraulic system according to one embodiment of the present application.

FIG. 5 is a schematic structural view schematically showing a hydraulic system according to one embodiment of the present application. The first wheels 51, the second wheels 52, the third wheels 53, the fourth wheels 54, the fifth wheels 55, the sixth wheels 56, and the seventh wheels 57 are shown in FIG. 5. In addition, FIG. 5 also shows a power-steering cylinder 5301 on the left side of the third axle, a power-steering cylinder 5302 on the right side of the third axle, a power-steering cylinder 5401 on the left side of the four axle, a power-steering cylinder 5402 on the right side of the four axle, a power-steering cylinder 5501 on the left side of the fifth axle, a power-steering cylinder 5502 on the right side of the fifth axle, a power-steering cylinder 5601 on the left side of the sixth axle, a power-steering cylinder 5602 on the right side of the sixth axle, a power-steering cylinder 5701 on the left side of the seventh axle and a power-steering cylinder 5702 on the right side of the seventh axle. Furthermore, a hydraulic pump (for example, a plunger pump) 511, a power take-off 512, an engine 513, a first steering pump 514, a second steering pump 515, a front steering emergency pump 516, a first valve block 517 and a second valve block 518 are also shown in FIG. 5. For example, these components may be connected using the existing connection manners.

In an embodiment of the present application, the steering control system may also include a steering hydraulic system. The steering hydraulic system is used for controlling an action of the steering device of a corresponding wheel by hydraulic oil after receiving a steering electrical signal of the steering controller, thereby controlling steering of the wheel corresponding to the electrically controlled steering axle. The steering controller transmits a steering electrical signal to the steering hydraulic system according to the difference between the second steering angle and the theoretical steering angle.

In one embodiment, the steering hydraulic system may include: a hydraulic pump, a hydraulic oil tank, one or more directional solenoid valve blocks, and one or more latch valve blocks for locking one or more oil chambers. The steering controller is electrically connected to each of the directional solenoid valve blocks and each of the latch valve blocks respectively. Each of the directional solenoid valve blocks is respectively connected to the hydraulic pump, the hydraulic oil tank and the corresponding latch valve block through an oil passage. The hydraulic pump is connected to the hydraulic oil tank through an oil passage. Each of the latch valve blocks is connected to an oil chamber of the power-steering cylinder of the steering device through an oil passage. The steering controller transmits the steering electrical signal to the corresponding directional solenoid valve block and the latch valve block according to the difference between the second steering angle and the theoretical steering angle respectively, so that the oil passage of the directional solenoid valve block communicates with oil passage of the corresponding latch valve block, thereby controlling a projecting or retracting action of a piston of the corresponding power-steering cylinder, to control steering of a corresponding wheel.

For example, as shown in FIG. 5, the steering hydraulic system may include: a hydraulic pump 511, a hydraulic oil tank 501, a directional solenoid valve block 531 of the third axial, a latch valve block 532 of the third axle for locking one or more oil chambers, a directional solenoid valve block 541 of the fourth axle, a latch valve block 542 of the fourth axle for locking one or more oil chambers, a directional solenoid valve block 551 of the fifth axle, a latch valve block 552 of the fifth axle for locking one or more oil chambers, a directional solenoid valve block 561 of the sixth axle, a latch valve block 562 of the sixth axle for locking one or more oil chambers, a directional solenoid valve block 571 of the seventh axis and a latch valve block 572 of the sixth axle for locking one or more oil chambers. Each directional solenoid valve block may include a plurality of directional solenoid valves corresponding to different wheels respectively. Each of the latch valve blocks may include a latch valve for locking a large chamber and a latch valve for locking a small chamber of the power-steering cylinder of each different wheel respectively.

The operation of the hydraulic steering system will be described in detail below by taking the hydraulic pump 511, the hydraulic oil tank 501, the directional solenoid valve block 531 of the third axle, and latch valve block 532 of the third axle as an example.

When the third wheels need to be steered, the steering controller (not shown in FIG. 5) transmits a steering electrical signal respectively to the directional solenoid valve block 531 and the latch valve block 532 according to a difference between the second steering angle and the theoretical steering angle. For example, two directional solenoid valves in the directional solenoid valve block 531 corresponding to the left third wheel and the right third wheel respectively obtain the electrical signals for steering, thereby making the respective oil inlet passage and oil return passage communicate with the hydraulic oil tank. For another example, the latch valve for locking a large chamber and the latch valve for locking a small chamber in the latch valve block 532 respectively obtain an electrical signal for steering, so that a corresponding oil passage of the large chamber and a corresponding oil passage of the small chamber communicate with the hydraulic oil tank. The hydraulic pump 511 makes the hydraulic oil in the hydraulic oil tank 501 enter the power-steering cylinder 5301 on the left side of the third axle and the power-steering cylinder 5302 on the right side of the third axle, for example entering the large chambers of the two cylinders via the directional solenoid valve block 531 and the latch valve block 532 by way of the oil inlet passages, and then makes the hydraulic oil return to the hydraulic oil tank by way of the oil return passages, thereby finally realizing the steering action of the third wheel. The steering control operations of the other wheels are similar to that of the third wheels, and will not be repeated here.

Figure 6:
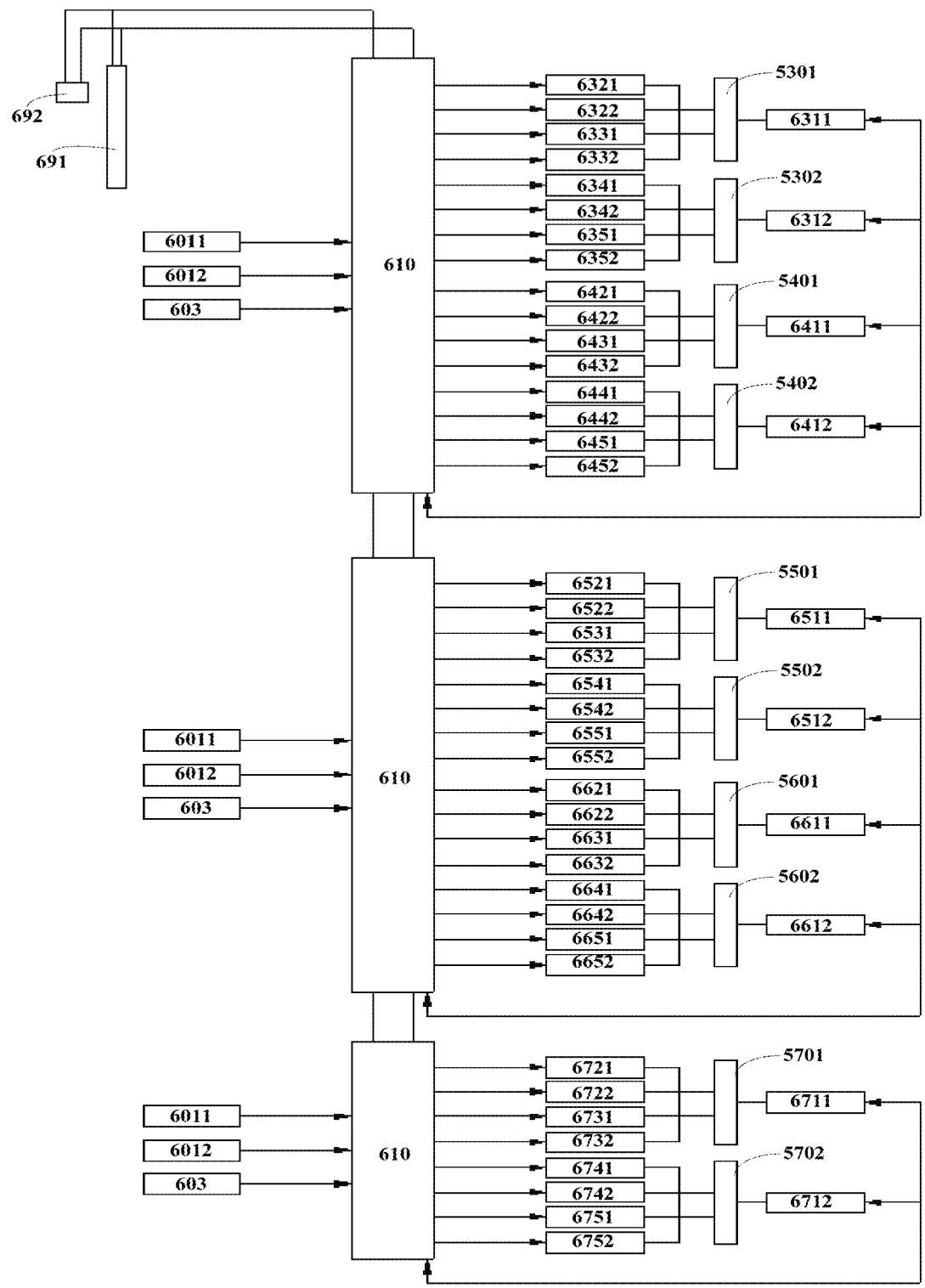
FIG. 6 is a schematic structural view schematically showing a steering control system according to another embodiment of the present application.

FIG. 6 is a schematic structural view schematically showing a steering control system according to another embodiment of the present application. As shown in FIG. 6, the steering control system includes three steering controllers 610. Of course, the three steering controllers may also be integrated into one steering controller, and the three steering controllers 610 are similar to the steering controller 310 shown in FIG. 3.

The steering control system may also include one or more first angle sensors and one or more second angle sensors.

In one embodiment, the first angle sensors may include one or more first axle angle sensors 6011 and one or more second axle angle sensors 6012. Each of the first axle angle sensors 6011 is used to collect an actual steering angle of one of the first wheels, and the second axle angle sensor 6012 is used to collect an actual steering angle of one of the second wheels.

In one embodiment, the second angle sensor may include: one or more third axle angle sensors, one or more fourth axle angle sensors, one or more fifth axle angle sensors, one or more sixth axle angle sensors, and one or more seventh axle angle sensors (not shown in FIG. 6). Each of the third axle angle sensors is used to collect an actual steering angle of one of the third wheels, each of the fourth axle angle sensors is used to collect an actual steering angle of one of the fourth wheels, and each of the fifth axle angle sensors is used to collect an actual steering angle of one of the fifth wheels, each of the sixth axle angle sensors is used to collect an actual steering angle of one of the sixth wheels, and each of the seventh axle angle sensors is used to collect an actual steering angle of one of the seventh wheels.

In one embodiment, as shown in FIG. 6, the directional solenoid valve block of the third axle may include: a solenoid valve 6321 for controlling the left wheel of the third axle to turn left, a solenoid valve 6322 for controlling the left wheel of the third axle to turn right, a solenoid valve 6341 for controlling the right wheel of the third axle to turn left and a solenoid valve 6342 for controlling the right wheel of the third axle to turn right.

In one embodiment, as shown in FIG. 6, the latch valve block of the third axle for locking one or more oil chambers may include: a latch valve 6331 for locking a large chamber of a left cylinder of the third axle, a latch valve 6332 for locking a small chamber of the left cylinder of the third axle, a latch valve 6351 for locking a large chamber of a right cylinder of the third axle and a latch valve 6352 for locking a small chamber of a right cylinder of the third axle.

In one embodiment, as shown in FIG. 6, the directional solenoid valve block of the fourth axle may include: a solenoid valve 6421 for controlling the left wheel of the fourth axle to turn left, a solenoid valve 6422 for controlling the left wheel of the fourth axle to turn right, a solenoid valve 6441 for controlling the right wheel of the fourth axle to turn left and a solenoid valve 6442 for controlling the right wheel of the fourth axle to turn right.

In one embodiment, as shown in FIG. 6, the latch valve block of the fourth axle for locking one or more oil chambers may include: a latch valve 6431 for locking a large chamber of a left cylinder of the fourth axle, a latch valve 6432 for locking a small chamber of the left cylinder of the fourth axle, a latch valve 6451 for locking a large chamber of a right cylinder of the fourth axle and a latch valve 6452 for locking a small chamber of a right cylinder of the fourth axle.

In one embodiment, as shown in FIG. 6, the directional solenoid valve block of the fifth axle may include: a solenoid valve 6521 for controlling the left wheel of the fifth axle to turn left, a solenoid valve 6522 for controlling the left wheel of the fifth axle to turn right, a solenoid valve 6541 for controlling the right wheel of the fifth axle to turn left and a solenoid valve 6542 for controlling the right wheel of the fifth axle to turn right.

In one embodiment, as shown in FIG. 6, the latch valve block of the fifth axle for locking one or more oil chambers may include: a latch valve 6531 for locking a large chamber of a left cylinder of the fifth axle, a latch valve 6532 for locking a small chamber of the left cylinder of the fifth axle, a latch valve 6551 for locking a large chamber of a right cylinder of the fifth axle and a latch valve 6552 for locking a small chamber of a right cylinder of the fifth axle.

In one embodiment, as shown in FIG. 6, the directional solenoid valve block of the sixth axle may include: a solenoid valve 6621 for controlling the left wheel of the sixth axle to turn left, a solenoid valve 6622 for controlling the left wheel of the sixth axle to turn right, a solenoid valve 6641 for controlling the right wheel of the sixth axle to turn left and a solenoid valve 6642 for controlling the right wheel of the sixth axle to turn right.

In one embodiment, as shown in FIG. 6, the latch valve block of the sixth axle for locking one or more oil chambers may include: a latch valve 6631 for locking a large chamber of a left cylinder of the sixth axle, a latch valve 6632 for locking a small chamber of the left cylinder of the sixth axle, a latch valve 6651 for locking a large chamber of a right cylinder of the sixth axle and a latch valve 6652 for locking a small chamber of a right cylinder of the sixth axle.

In one embodiment, as shown in FIG. 6, the directional solenoid valve block of the seventh axle may include: a solenoid valve 6721 for controlling the left wheel of the seventh axle to turn left, a solenoid valve 6722 for controlling the left wheel of the seventh axle to turn right, a solenoid valve 6741 for controlling the right wheel of the seventh axle to turn left and a solenoid valve 6742 for controlling the right wheel of the seventh axle to turn right.

In one embodiment, as shown in FIG. 6, the latch valve block of the seventh axle for locking one or more oil chambers may include: a latch valve 6731 for locking a large chamber of a left cylinder of the seventh axle, a latch valve 6732 for locking a small chamber of the left cylinder of the seventh axle, a latch valve 6751 for locking a large chamber of a right cylinder of the seventh axle and a latch valve 6752 for locking a small chamber of a right cylinder of the seventh axle.

FIG. 6 also shows the power-steering cylinder 5301, the power-steering cylinder 5302, the power-steering cylinder 5401, the power-steering cylinder 5402, the power-steering cylinder 5501, the power-steering cylinder 5502, the power-steering cylinder 5601, the power-steering cylinder 5602, the power-steering cylinder 5701 and the power-steering cylinder 5702. In addition, FIG. 6 also shows a steering angle 6311 of the left wheel of the third axle cylinder, a steering angle 6312 of the right wheel of the third axle cylinder, a steering angle 6411 of the left wheel of the fourth axle cylinder, a steering angle 6412 of the right wheel of the fourth axle cylinder, a steering angle 6511 of the left wheel of the fifth axle cylinder, a steering angle 6512 of the right wheel of the fifth axle cylinder, a steering angle 6611 of the left wheel of the sixth axle cylinder, a steering angle 6612 of the right wheel of the sixth axle cylinder a steering angle 6711 of the left wheel of the seventh axle cylinder, and a steering angle 6712 of the right wheel of the seventh axle cylinder.

The operation process of the steering control system will be described below by taking the steering of the third wheels as an example.

The steering controller 610 receives the actual steering angles of the first wheels and the actual steering angles of the second wheels from the first axle angle sensors 6011 and the second axle angle sensors 6012 respectively. When the wheels are steered, since the steering angles of the first wheels and the second wheels should satisfy the Ackermann theorem relationship. The steering angles of the first wheels may be calculated according to the Ackerman theorem relationship and the actual steering angles of the second wheels, and the calculated steering angles of the first wheels are compared with the actual steering angles of the first wheels. If the difference therebetween is within an allowed range the actual steering angles of the first wheels that are collected may be determined to be correct. The steering controller 610 then calculates the theoretical steering angles of the third wheels in the corresponding travel mode according to at least one of the actual steering angles of the first wheels. Next, the steering controller 610 transmits an electrical signal to the solenoid valve 6321, the solenoid valve 6341, the latch valve 6331, the latch valve 6332, the latch valve 6351 and the latch valve 6352 according to the difference between the actual steering angles and the theoretical steering angles of the third wheels, to control actions of the power-steering cylinder 5301 and the power-steering cylinder 5302, so as to control the third wheels to turn left. In some embodiments, the difference is a positive value indicating that the wheels turn left and the difference is a negative value indicating that the wheel turns right. The actual steering angles of the first wheels may be input as references for steering angles of the rear axles. The actual steering angles of the second wheels may be used as a judgment design and a redundant design for the steering angles the first wheels. When the steering angles of the first wheels are input to the steering controller, the steering angles of the second wheels are used to determine whether the input signal of the steering angles of the first wheels are correct. The relationship between the steering angles of the first wheels and the second wheels are pre-stored in the steering controller.

Regarding the steering control operations of other wheels, similar to the above-described embodiment of the third wheels, they will not be repeated here.

In the embodiments of the present application, as shown in FIG. 6, the steering control system may further include: a vehicle speed detecting device 603. The vehicle speed detecting device 603 is used for obtaining a vehicle speed and transmitting the vehicle speed to the steering controller 610. The steering controller 610 may adjust the steering angles of the wheels corresponding to the electrically controlled steering axles in conjunction with the vehicle speed. For example, the vehicle speed detecting device 603 may be a gearbox or an ABS (antilock brake system) of the vehicle itself. That is, the vehicle speed signal may be obtained from the gearbox or from the interior of the ABS of the vehicle itself.

In the embodiments of the present application, the steering control system may further include: a central controller 691 and a display 692. The central controller 691 controls the whole vehicle and communicates with the steering controller to transmit a steering angle signal to the display 692. The driver may observe the state of the vehicle steering system on the display.

Figure 7A:
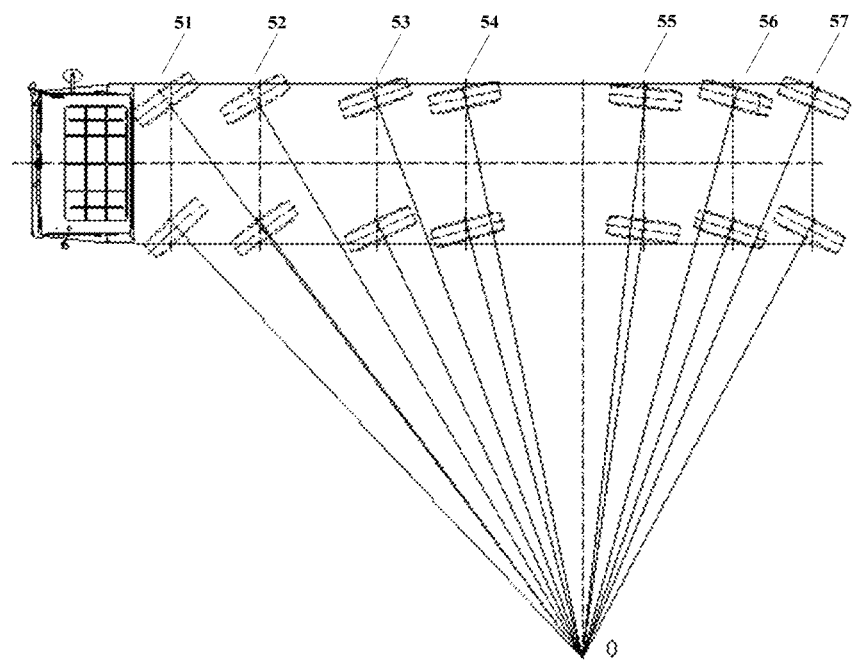
FIG. 7A is a schematic view schematically showing steering of a vehicle in a normal road travel mode according to one embodiment of the present application.

FIG. 7A is a schematic view schematically showing steering of a vehicle in a normal road travel mode according to one embodiment of the present application. As shown in FIG. 7A, in the normal road travel mode, the steering directions of the fifth wheels 55, the sixth wheels 56, and the seventh wheels 57 are opposite to those of the first wheels 51, the second wheels 52, and the third wheels 53 and the fourth wheels 54, and the steering angles of the first wheels 51 to the seventh wheels 57 satisfy the Ackerman theorem.

Figure 7B:
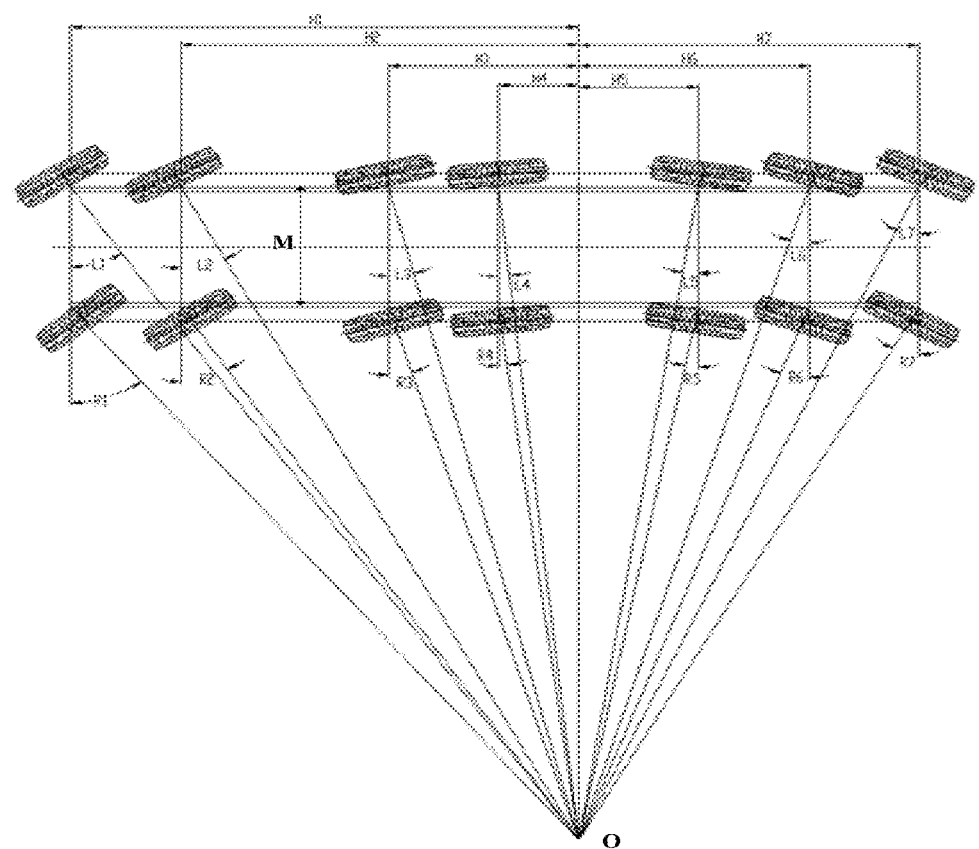
FIG. 7B is a schematic view schematically showing a wheel state of a vehicle during steering in a normal road travel mode according to one embodiment of the present application.

FIG. 7B is a schematic view schematically showing a wheel state of a vehicle during steering in a normal road travel mode according to one embodiment of the present application. As shown in FIG. 7, the steering angles of the left wheels (or tires) are represented by L, and the steering angles of the left wheels of the axles are represented by L1, L2, L3, L4, L5, L6 and L7 respectively. The values of the steering angles of the wheels behind the axis passing through the steering center O and perpendicular to the traveling direction of the vehicle are negative values, and the values of the steering angles of the wheels in front of the axis are positive values. The steering angles of the right wheels (or tires) are represented by R, and the steering angles of the right wheels of the axles are represented by R1, R2, R3, R4, R5, R6 and R7 respectively. The values of the steering angles of the wheels behind the axis passing through the steering center O and perpendicular to the traveling direction of the vehicle are a negative values, and the values of the steering angles of the wheels in front of the axis are positive values. The distances from the axles to the axis are represented by H, and the distances from the axles to the axis are represented by H1, H2, H3, H4, H5, H6, and H7 respectively. The values of the distances behind the axis are negative values, and the values of the distances in front of the axis are negative values.

Knowing the steering angle L1 of the left wheel of the first axle, a wheelbase between every two axles, a distance M between two intersections of extension lines and the ground. The extension lines are extension lines of centerlines of two main pins, and the two main pins are main pins of a left wheel and a right wheel on the same axle respectively, and the distance H from each axle to the axis passing through the steering center O and perpendicular to the traveling direction of the vehicle, the relationship between the steering angle of each wheel of each axle and the steering angle L1 is as follows:

$$L1 \text{ known}; L_2 = \arctan\left(\frac{H_2 * \tan L_1}{H_1}\right); L_3 = \arctan\left(\frac{H_3 * \tan L_1}{H_1}\right);$$

$$L_4 = \arctan\left(\frac{H_4 * \tan L_1}{H_1}\right); L_5 = \arctan\left(\frac{H_5 * \tan L_1}{H_1}\right);$$

$$L_6 = \arctan\left(\frac{H_6 * \tan L_1}{H_1}\right);$$

$$L_7 = \arctan\left(\frac{H_7 * \tan L_1}{H_1}\right) \circ R_1 = \arctan\left(\frac{H_1 * \tan L_1}{H_1 - M * \tan L_1}\right);$$

$$R_2 = \arctan\left(\frac{H_2 * \tan L_1}{H_1 - M * \tan L_1}\right); R_3 = \arctan\left(\frac{H_3 * \tan L_1}{H_1 - M * \tan L_1}\right);$$

$$R_4 = \arctan\left(\frac{H_4 * \tan L_1}{H_1 - M * \tan L_1}\right); R_5 = \arctan\left(\frac{H_5 * \tan L_1}{H_1 - M * \tan L_1}\right);$$

$$R_6 = \arctan\left(\frac{H_6 * \tan L_1}{H_1 - M * \tan L_1}\right); R_7 = \arctan\left(\frac{H_7 * \tan L_1}{H_1 - M * \tan L_1}\right) \circ$$

In the normal road travel mode, after the steering controller acquires the steering angle L1 of the first axle (i.e., the actual steering angle of the left one of the first wheels, which is collected by one of the first angle sensors), the theoretical steering angle of the wheel corresponding to each axle may be calculated in the normal road travel mode. The wheel steering may be controlled in conjunction of the actual steering angle of each wheel, until a difference between the actual steering angle and the theoretical steering angle of the corresponding wheel is within a preset range.

Figure 8A:
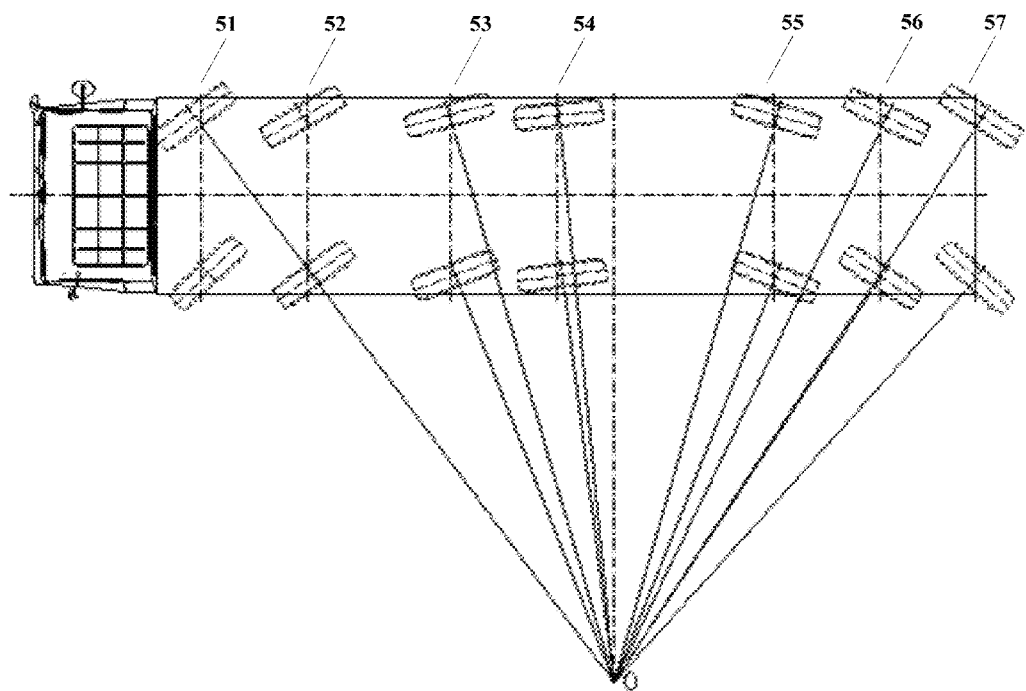
FIG. 8A is a schematic view schematically showing steering of a vehicle in a small turning travel mode according to one embodiment of the present application.

FIG. 8A is a schematic view schematically showing steering of a vehicle in a small turning travel mode according to one embodiment of the present application. As shown in FIG. 8A, in the small turning travel mode, the steering directions of the fifth wheels 55, the sixth wheels 56, and the seventh wheels 57 are opposite to those of the first wheels 51, the second wheels 52, and the third wheels 53 and the fourth wheels 54, and the steering angles of the first wheels 51 to the seventh wheels 57 satisfy the Ackerman theorem.

Figure 8B:
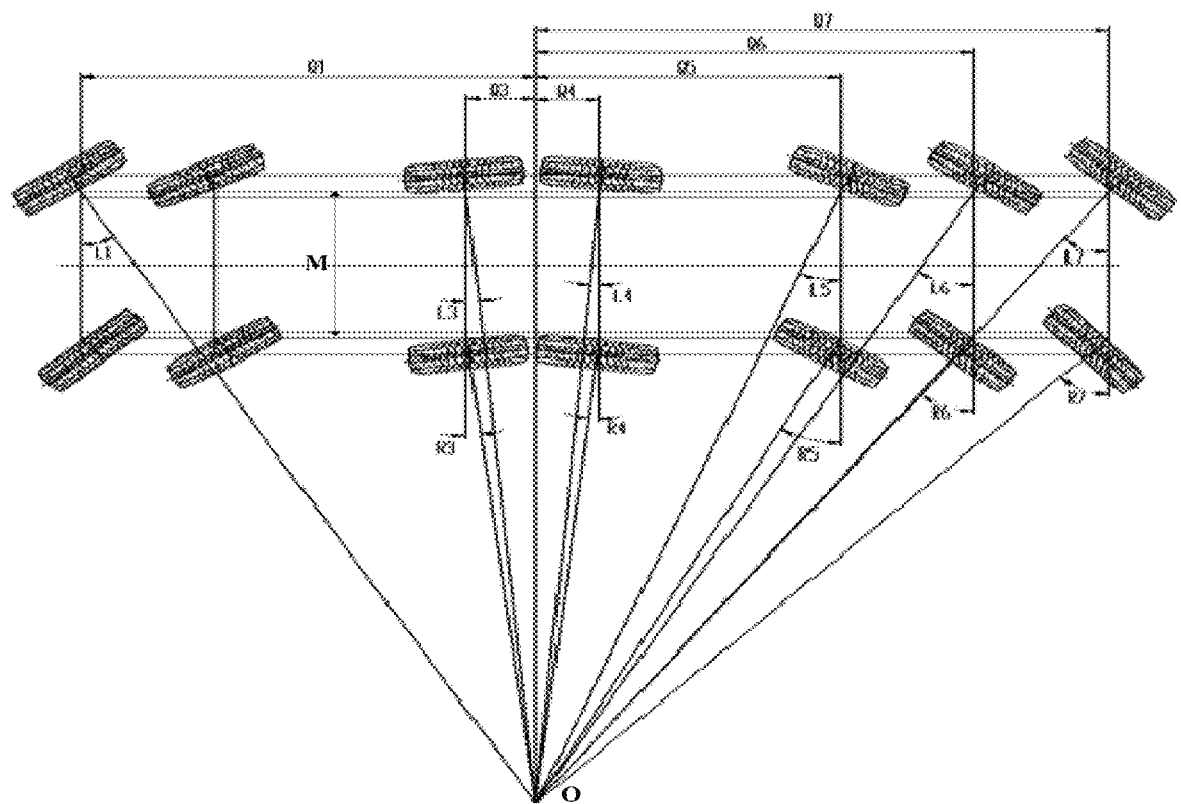
FIG. 8B is a schematic view schematically showing a wheel state of a vehicle during steering in a small turning travel mode according to one embodiment of the present application.

FIG. 8B is a schematic view schematically showing a wheel state of a vehicle during steering in a small turning travel mode according to one embodiment of the present application. As shown in FIG. 8B, the steering angles of the left wheels (or tires) are represented by L, and the steering angles of the left wheels of the axles are represented by L1, L2 (L2 not shown in FIG. 8B), L3, L4, L5, L6 and L7 respectively. The values of the steering angles of the wheels behind the axis passing through the steering center O and perpendicular to the traveling direction of the vehicle are negative values, and the values of the steering angles of the wheels in front of the axis are positive values. The steering angles of the right wheels (or tires) are represented by R, and the steering angles of the right wheels of the axles are represented by R1, R2 (R1 and R2 not shown in FIG. 8B), R3, R4, R5, R6 and R7 respectively. The values of the steering angles of the wheels behind the axis that passing through the steering center O and perpendicular to the traveling direction of the vehicle, are negative values, and the values of the steering angles of the wheels in front of the axis are positive values. The distances from the axles to the axis are represented by Q, and the distances from the axles to the axis are represented by Q1, Q2, Q3, Q4, Q5, Q6, and Q7 respectively. The values of the distances behind the axis are negative values, and the values of the distances in front of the axis are negative values.

Knowing the steering angle L1 of the left wheel of the first axle, a distance M between two intersections of extension lines and the ground. The extension lines are extension lines of centerlines of two main pins, and the two main pins are main pins of a left wheel and a right wheel on the same axle respectively, and the distance Q from each axle to the axis passing through the steering center O and perpendicular to the traveling direction of the vehicle, the relationship between the steering angle of each wheel of each axle and the steering angle L1 is as follows:

$$L1 \text{ known}; L_3 = \arctan\left(\frac{Q_3 * \tan L_1}{Q_1}\right); L_4 = \arctan\left(\frac{Q_4 * \tan L_1}{Q_1}\right)$$

$$L_5 = \arctan\left(\frac{Q_5 * \tan L_1}{Q_1}\right); L_6 = \arctan\left(\frac{Q_6 * \tan L_1}{Q_1}\right);$$

$$L_7 = \arctan\left(\frac{Q_7 * \tan L_1}{Q_1}\right).$$

$$R_3 = \arctan\left(\frac{Q_3 * \tan L_1}{Q_1 - M * \tan L_1}\right); R_4 = \arctan\left(\frac{Q_4 * \tan L_1}{Q_1 - M * \tan L_1}\right);$$

$$R_5 = \arctan\left(\frac{Q_5 * \tan L_1}{Q_1 - M * \tan L_1}\right); R_6 = \arctan\left(\frac{Q_6 * \tan L_1}{Q_1 - M * \tan L_1}\right);$$

$$R_7 = \arctan\left(\frac{Q_7 * \tan L_1}{Q_1 - M * \tan L_1}\right).$$

In the small turning travel mode, after the steering controller acquires the steering angle L1 of the first axle (i.e., the actual steering angle of the left one of the first wheels, which is collected by one of the first angle sensors), the theoretical steering angle of the wheel corresponding to each axle may be calculated in the small turning travel mode. The wheel steering may be controlled in conjunction of the actual steering angle of each wheel, until a difference between the actual steering angle and the theoretical steering angle of the corresponding wheel is within a preset range.

Figure 9A:
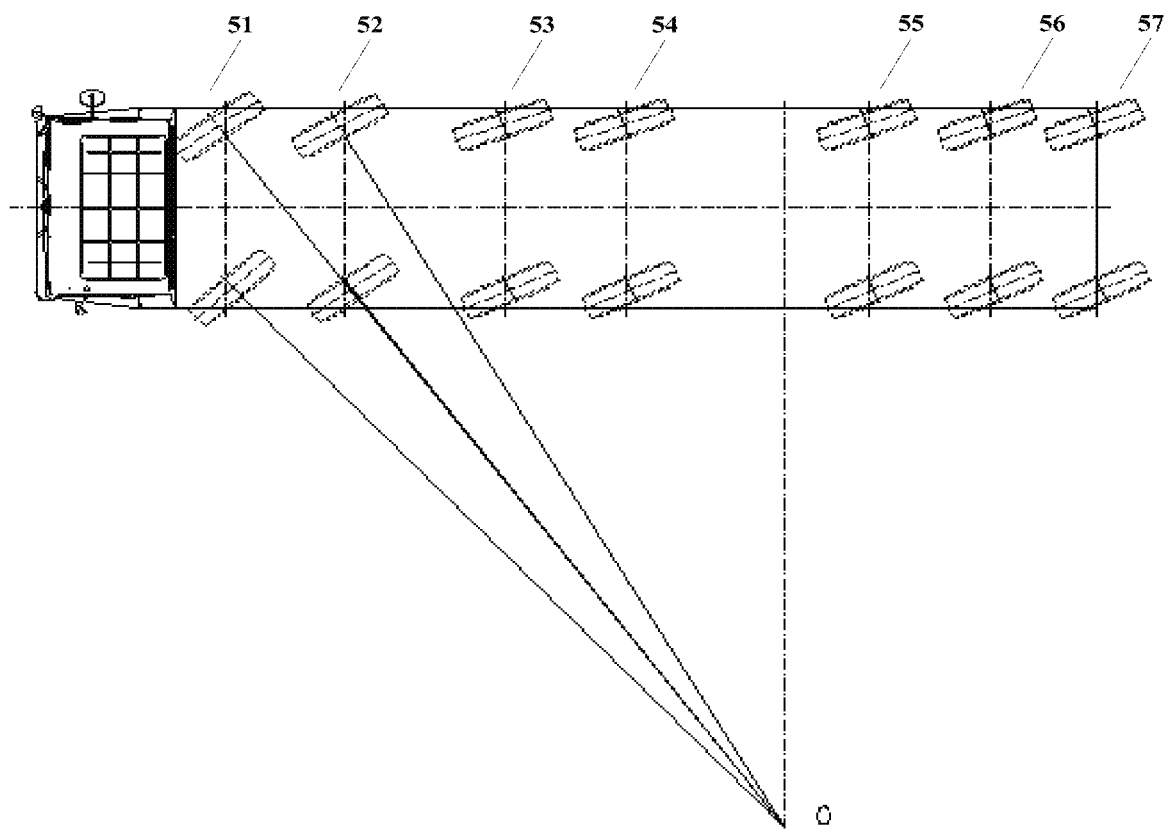
FIG. 9A is a schematic view schematically showing steering of a vehicle in a crab-like travel mode according to one embodiment of the present application.

FIG. 9A is a schematic view schematically showing steering of a vehicle in a crab-like travel mode according to one embodiment of the present application. As shown in FIG. 9A, in the crab-like travel mode, the steering directions of the first wheels 51 to the seventh wheels 57 are the same, and the steering angles of the first wheels 51 and the second wheels 52 satisfy the Ackerman theorem.

Figure 9B:
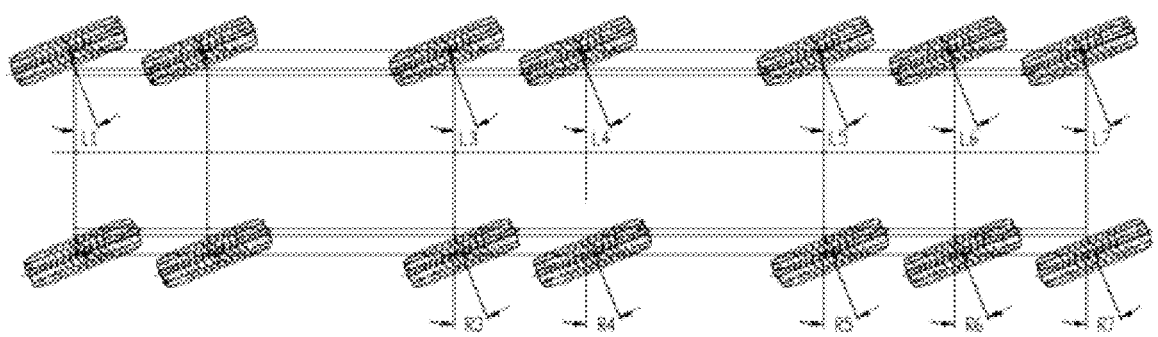
FIG. 9B is a schematic view schematically showing a wheel state of a vehicle during steering in a crab-like travel mode according to one embodiment of the present application.

FIG. 9B is a schematic view schematically showing a wheel state of a vehicle during steering in a crab-like travel mode according to one embodiment of the present application. As shown in FIG. 9B, the steering angles of the left wheels (or tires) are represented by L, and the steering angles of the left wheels of the axles are represented by L1, L2 (L2 not shown in FIG. 9B), L3, L4, L5, L6 and L7 respectively. The steering angles of the right wheels (or tires) are represented by R, and the steering angles of the right wheels of the axles are represented by R1, R2 (R1 and R2 not shown in FIG. 9B), R3, R4, R5, R6 and R7 respectively. Knowing the steering angle L1 of the left wheel of the first axle, the relationship between the steering angle of each wheel of each axle and the steering angle L1 is as follows:

L1 known; L1=L3=L4=L5=L6=L7=R3=R4=R5=R6=R7.

In the crab-like travel mode, after the steering controller acquires the steering angle L1 of the first axle (i.e., the actual steering angle of the left one of the first wheels, which is collected by one of the first angle sensors), the theoretical steering angle of the wheel corresponding to each axle may be calculated in the crab-like travel mode. The wheel steering may be controlled in conjunction of the actual steering angle of each wheel, until the actual steering angle of the corresponding wheel is adjusted to be equal to the steering angle of the first axle.

Figure 10A:
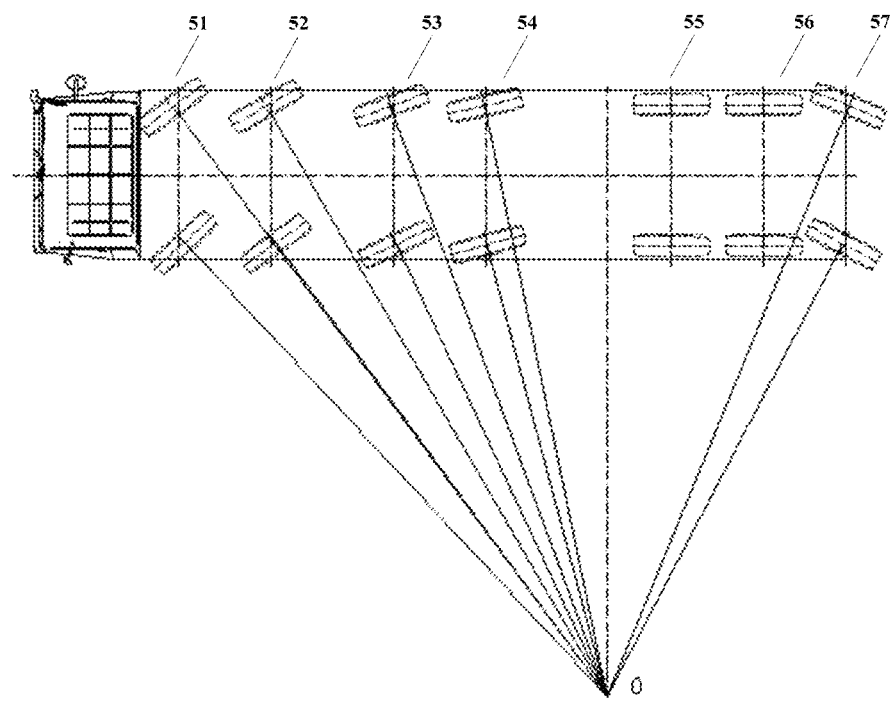
FIG. 10A is a schematic view schematically showing steering of a vehicle in a tail slide preventing travel mode according to one embodiment of the present application.

FIG. 10A is a schematic view schematically showing steering of a vehicle in a tail slide preventing travel mode according to one embodiment of the present application. As shown in FIG. 10A, in the tail slide preventing travel mode, the steering directions of the seventh wheel 57 are opposite to the steering directions of the first wheels 51, the second wheels 52, the third wheels 53, and the fourth wheels 54, the fifth wheels 55 and the sixth wheels 56 do not take part in steering, and the steering angles of the first wheels 51, the second wheels 52, the third wheels 53, the fourth wheels 54, and the seventh wheels 57 satisfy the Ackermann theorem.

Figure 10B:
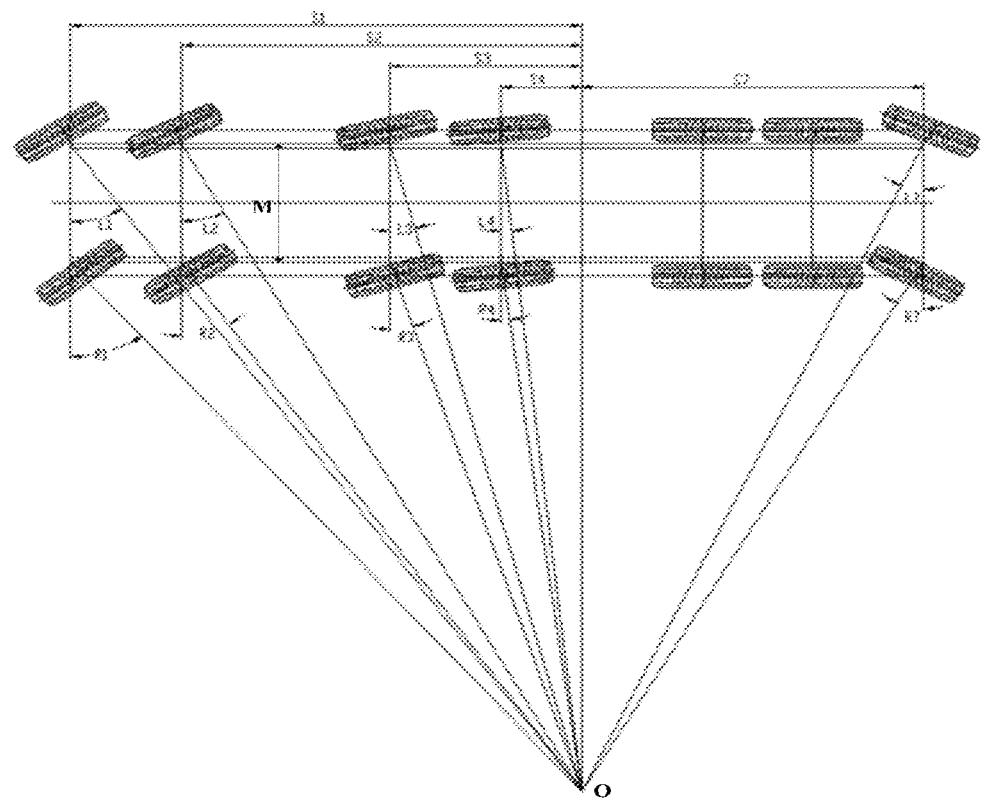
FIG. 10B is a schematic view schematically showing a wheel state of a vehicle during steering in a tail slide preventing travel mode according to one embodiment of the present application.

FIG. 10B is a schematic view schematically showing a wheel state of a vehicle during steering in a tail slide preventing travel mode according to one embodiment of the present application. As shown in FIG. 10B, the steering angles of the left wheels (or tires) are represented by L, and the steering angles of the left wheels of the axles are represented by L1, L2, L3, L4, L5, L6 and L7 respectively. The values of the steering angles of the wheels behind the axis passing through the steering center O and perpendicular to the traveling direction of the vehicle are negative values, and the values of the steering angles of the wheels in front of the axis are positive values. The steering angles of the right wheels (or tires) are represented by R, and the steering angles of the right wheels of the axles are represented by R1, R2, R3, R4, R5, R6 and R7 respectively. The values of the steering angles of the wheels behind the axis passing through the steering center O and perpendicular to the traveling direction of the vehicle are a negative values, and the values of the steering angles of the wheels in front of the axis are positive values. The distances from the axles to the axis are represented by S, and the distances from the axles to the axis are represented by S1, S2, S3, S4, S5, S6, and S7 respectively. The values of the distances behind the axis are negative values, and the values of the distances in front of the axis are negative values. Knowing the steering angle L1 of the left wheel of the first axle, a distance M between two intersections of extension lines and the ground. The extension lines are extension lines of centerlines of two main pins, and the two main pins are main pins of a left wheel and a right wheel on the same axle respectively, and the distance S from each axle to the axis passing through the steering center O and perpendicular to the traveling direction of the vehicle, the relationship between the steering angle of each wheel of each axle and the steering angle L1 is as follows:

$$L_1 \text{ known}; L_2 = \arctan\left(\frac{S_2 * \tan L_1}{S_1}\right); L_3 = \arctan\left(\frac{S_3 * \tan L_1}{S_1}\right);$$

$$L_4 = \arctan\left(\frac{S_4 * \tan L_1}{S_1}\right); L_5 = 0; L_6 = 0; L_7 = \arctan\left(\frac{S_7 * \tan L_1}{S_1}\right).$$

$$R_1 = \arctan\left(\frac{S_1 * \tan L_1}{S_1 - M * \tan L_1}\right); R_2 = \arctan\left(\frac{S_2 * \tan L_1}{S_1 - M * \tan L_1}\right);$$

$$R_3 = \arctan\left(\frac{S_3 * \tan L_1}{S_1 - M * \tan L_1}\right); R_4 = \arctan\left(\frac{S_4 * \tan L_1}{S_1 - M * \tan L_1}\right); R_5 = 0;$$

$$R_6 = 0; R_7 = \arctan\left(\frac{S_7 * \tan L_1}{S_1 - M * \tan L_1}\right).$$

In the tail slide preventing travel mode, after the steering controller acquires the steering angle L1 of the first axle (i.e., the actual steering angle of the left one of the first wheels, which is collected by one of the first angle sensors), the theoretical steering angle of the wheel corresponding to each axle may be calculated in the tail slide preventing travel mode. The wheel steering may be controlled in conjunction of the actual steering angle of each wheel, until a difference between the actual steering angle and the theoretical steering angle of the corresponding wheel is within a preset range.

Figure 11A:
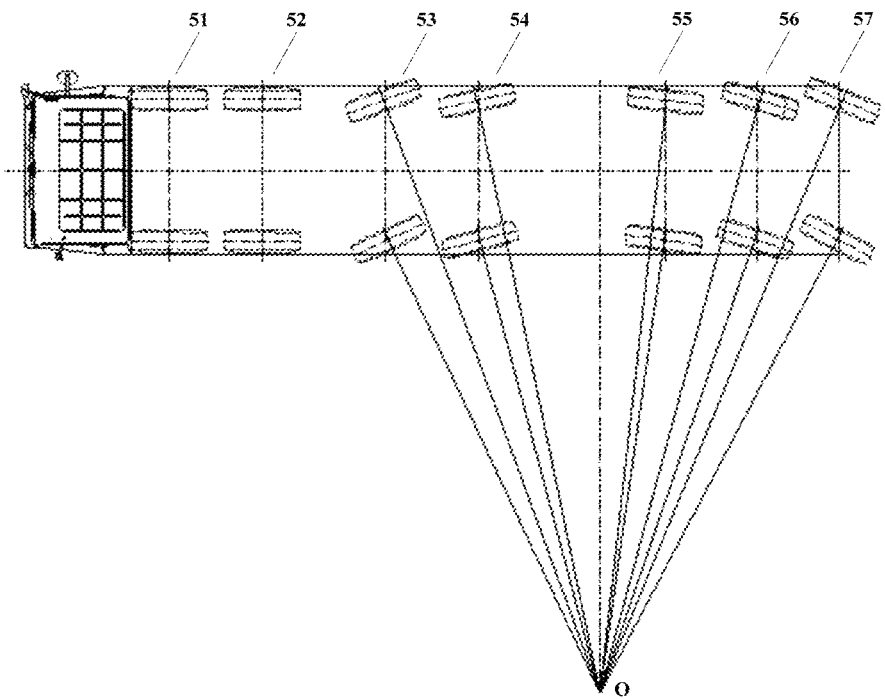
FIG. 11A is a schematic view schematically showing steering of a vehicle in a rear axle independent steering travel mode according to one embodiment of the present application.

FIG. 11A is a schematic view schematically showing steering of a vehicle in a rear axle independent steering travel mode according to one embodiment of the present application. As shown in FIG. 11A, in the tail slide preventing travel mode, the steering directions of the fifth wheels 55, the sixth wheels 56, and the seventh wheels 57 are opposite to those of the third wheels 53, and the fourth wheels 54; the first wheels 51 and the second wheels 52 do not take part in steering; and the steering angles of the first wheel s53 to the seventh wheels 57 satisfy the Ackerman theorem.

Figure 11B:
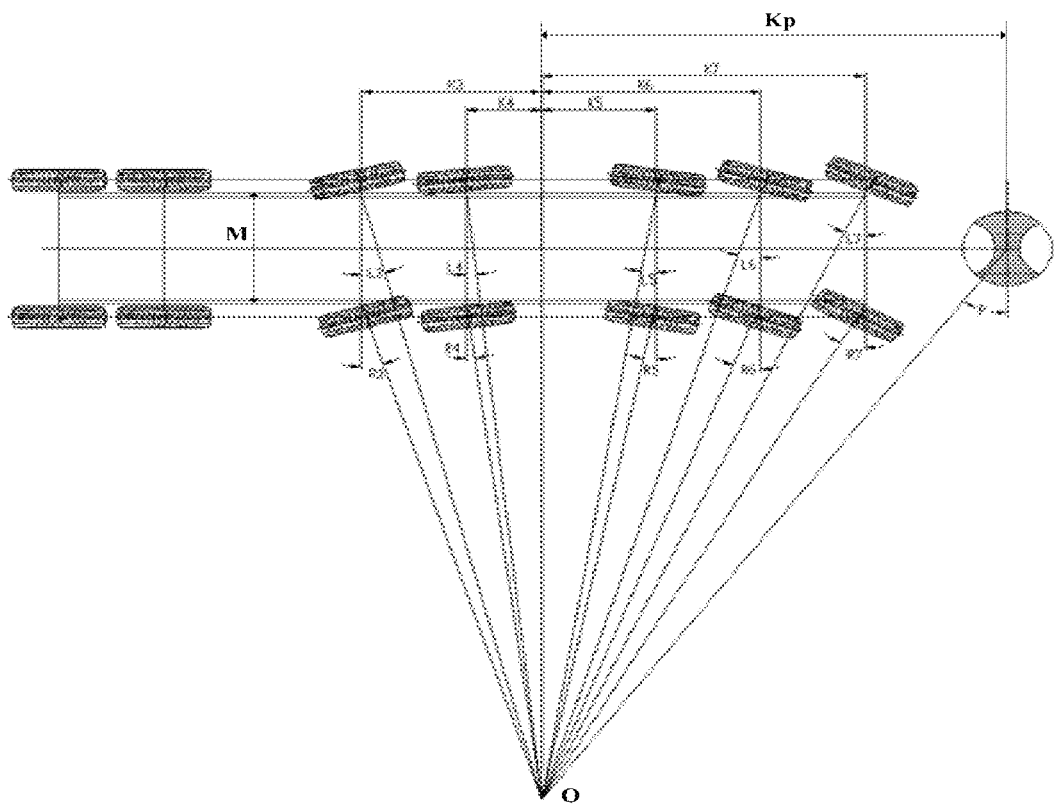
FIG. 11B is a schematic view schematically showing a wheel state of a vehicle during steering in a rear axle independent steering travel mode according to one embodiment of the present application.

FIG. 11B is a schematic view schematically showing a wheel state of a vehicle during steering in a rear axle independent steering travel mode according to one embodiment of the present application. As shown in FIG. 11B, the steering angles of the left wheels (or tires) are represented by L, and the steering angles of the left wheels of the axles are represented by L1, L2 (L1 and L2 not shown in FIG. 11B), L3, L4, L5, L6 and L7 respectively. The values of the steering angles of the wheels behind the axis passing through the steering center O and perpendicular to the traveling direction of the vehicle are negative values, and the values of the steering angles of the wheels in front of the axis are positive values. The steering angles of the right wheels (or tires) are represented by R, and the steering angles of the right wheels of the axles are represented by R1, R2 (R1 and R2 not shown in FIG. 11B), R3, R4, R5, R6 and R7 respectively. The values of the steering angles of the wheels behind the axis passing through the steering center O and perpendicular to the traveling direction of the vehicle are a negative values, and the values of the steering angles of the wheels in front of the axis are positive values. The distances from the axles to the axis are represented by K, the distances from the axles to the axis are represented by K1, K2 (K1 and K2 not shown in FIG. 11B), K3, K4, K5, K6, and K7 respectively. The values of the distances behind the axis are negative values, and the values of the distances in front of the axis are negative values. Knowing a rotation angle P of a knob (the knob refers to a knob used to control the independent steering of the rear axles. The mechanical steering axles are controlled by the steering wheel, the so-called independent steering of the rear axles means that the mechanical steering axles are not steered, the electrically controlled steering axles are independently steered, and the greatness of the steering angle of the knob determines that of the steering angles of the rear axles), the vertical distance Kp from the knob to the axis passing through the steering center O and perpendicular to the traveling direction of the vehicle, a distance M between two intersections of extension lines and the ground. The extension lines are extension lines of centerlines of two main pins, and the two main pins are main pins of a left wheel and a right wheel on the same axle respectively, and the distance K from each axle to the axis passing through the steering center O and perpendicular to the traveling direction of the vehicle, the relationship between the steering angle of each axle and the rotation angle P of the knob is as follows:

$$L_3 = \arctan\left(\frac{K_3}{\frac{K_p}{\tan P} + \frac{M}{2}}\right); L_4 = \arctan\left(\frac{K_4}{\frac{K_p}{\tan P} + \frac{M}{2}}\right);$$

$$L_5 = \arctan\left(\frac{K_5}{\frac{K_p}{\tan P} + \frac{M}{2}}\right); L_6 = \arctan\left(\frac{K_6}{\frac{K_p}{\tan P} + \frac{M}{2}}\right);$$

$$L_7 = \arctan\left(\frac{K_7}{\frac{K_p}{\tan P} + \frac{M}{2}}\right).$$

$$R_3 = \arctan\left(\frac{K_3}{\frac{K_p}{\tan P} - \frac{M}{2}}\right); R_4 = \arctan\left(\frac{K_4}{\frac{K_p}{\tan P} - \frac{M}{2}}\right);$$

$$R_5 = \arctan\left(\frac{K_5}{\frac{K_p}{\tan P} - \frac{M}{2}}\right); R_6 = \arctan\left(\frac{K_6}{\frac{K_p}{\tan P} - \frac{M}{2}}\right);$$

$$R_7 = \arctan\left(\frac{K_7}{\frac{K_p}{\tan P} - \frac{M}{2}}\right).$$

In the rear axle independent steering travel mode, after the steering controller acquires the steering angle L1 of the first axle (L1=0 at this time), the rotation angle of the knob of the vehicle and the vertical distance from the knob to the axis passing through the steering center O and perpendicular to the traveling direction of the vehicle may also be obtained, and then the theoretical steering angles of the third wheels to the seventh wheels are calculated in conjunction with the steering angle of the knob and the vertical distance. The wheel steering may be controlled in conjunction of the actual steering angle of each wheel, until a difference between the actual steering angle and the theoretical steering angle of the corresponding wheel is within a preset range.

Figure 12:
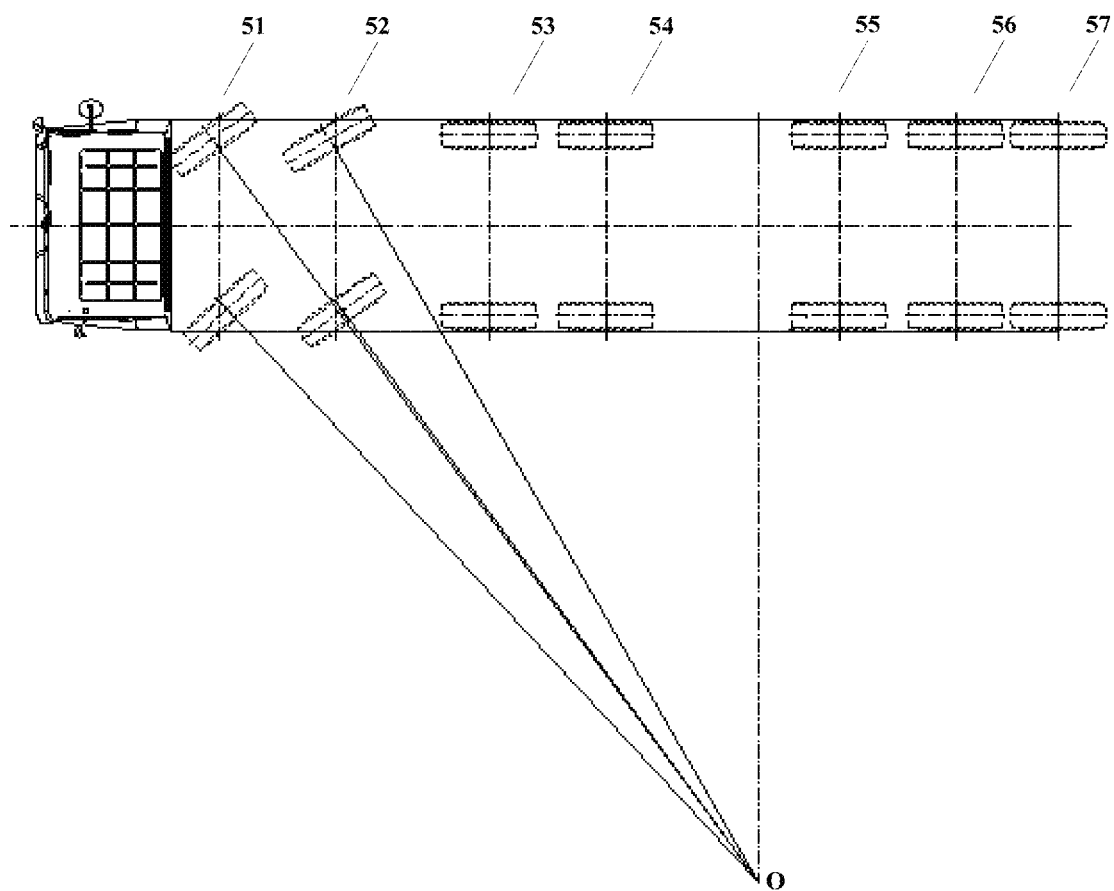
FIG. 12 is a schematic view schematically showing steering of a vehicle in a rear axle locking travel mode according to one embodiment of the present application.

FIG. 12 is a schematic view schematically showing steering of a vehicle in a rear axle locking travel mode according to one embodiment of the present application. In the rear axle locking travel mode, the third wheels 53 to the seventh wheels 57 do not take part in steering (also i.e., the steering angles of the third wheels 53, the fourth wheels 54, the fifth wheels 55, the sixth wheels 56 and the seventh wheels 57 is 0), and the steering angles of the first wheels 51 and the second wheels 52 satisfy the Ackerman theorem.

In the rear axle locking steering mode, the steering controller adjusts the steering angles of the third wheels to the seventh wheels to 0 degree (i.e., not taking part in steering) after acquiring the steering angle L1 of the first axle, thereby realizing the steering operation in this mode.

In the above six modes, the steering between the left and right tires of each electrically controlled steering axle may not be associated. During the shift of the steering modes, the steering wheels may be steered in position according to a predetermined theorem without being mechanically constrained any longer.

In the embodiments of the present application, during the travel of the vehicle, the steering angles of the wheels of the first axle are input the steering controller as a reference, and the steering angles of the wheels of the second axle are input the steering controller as a redundant signal. The steering controller after acquiring the input conditions, outputs a steering electrical signal to control a corresponding valve to actuate an action after calculation inside the program inside, such that the power-steering cylinders finally push the wheels to rotate as actuation elements. After the wheel rotates, the angle sensors inside the suspension cylinders feedback the signals of the steering angles of the wheels to the steering controller. The steering controller inside may compare the signal of the obtained actual steering angles with the signal of the theoretical steering angles, and continuously adjust the steering angles of the wheels to obtain an optimum steering angles of the wheels.

In one embodiment, the steering control system may also include one or more position detecting switches. Each of the position detecting switches is disposed on the power-steering cylinder of the corresponding steering device, for detecting a position of a piston in the power-steering cylinder and transmitting the position of the piston to the steering controller. The steering controller determines whether the power-steering cylinder is in a neutral position according to the position of the piston, and controls movement of the piston when the power-steering cylinder is not in the neutral position, such that the power-steering cylinder is in the neutral position. The power-steering cylinder in (or returns to) the neutral position refers to that the steering angle of the corresponding wheel is zero. One position detecting switch may correspond to one power-steering cylinder and one steering device.

In one embodiment, the steering control system may also comprise one or more displacement sensors. Each of the displacement sensors is disposed on the power-steering cylinder of the corresponding steering device, for detecting a displacement of a piston in the power-steering cylinder and transmitting the displacement to the steering controller. The steering controller determines whether the power-steering cylinder is in the neutral position according to the displacement, and controls movement of the piston when the steering cylinder is not in the neutral position, so that the power-steering cylinder is in the neutral position. One displacement sensor may correspond to one power-steering cylinder and one steering device.

In one embodiment, the steering controller is further configured to lock a position of the piston after the power-steering cylinder is in the neutral position, and to perform an automatic zeroing operation of the corresponding first angle sensor and the corresponding second angle after adjusting positioning parameters of the corresponding wheel.

Figure 13:
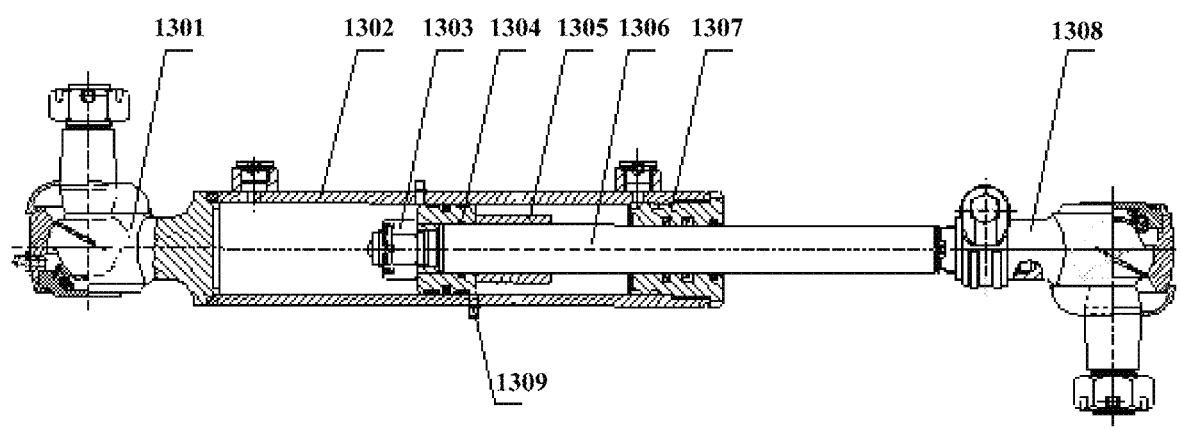
FIG. 13 is a schematic structural view showing a power-steering cylinder with a position detecting switch according to one embodiment of the present application.

FIG. 13 is a schematic structural view showing a power-steering cylinder with a position detecting switch according to one embodiment of the present application. As shown in FIG. 13, the power-steering cylinder includes: a ball 1301 of the power-steering cylinder, a cylinder barrel 1302, a nut 1303, a piston 1304, a sealing means 1305, a cylinder rod 1306, a guide sleeve 1307, and an adjustable ball 1308. The ball 1301 is connected to the cylinder barrel 1302. The piston 1304 is disposed inside the cylinder barrel 1302, and fixed to one end of the cylinder rod 1306 through the nut 1303. The sealing means 1305 is wrapped on the cylinder rod 1306. Further, the guide sleeve 1307 is disposed between the cylinder barrel 1302 and the cylinder rod 1306. The adjustable ball 1308 is connected to the other end of the cylinder rod 1306.

In one embodiment, as shown in FIG. 13, the power-steering cylinder may further include a position detecting switch 1309. The position detecting switch is integrated together with other components of the power-steering cylinder. The position detecting switch 1309 is disposed on the cylinder barrel 1302 of the power-steering cylinder. For example, an internal thread matching the position detecting switch 1309 may be provided at a specific position of the cylinder barrel 1302. A corresponding external thread may be provided on the position detecting switch 1309 which may be directly mounted on the cylinder barrel of the power-steering cylinder. The position detecting switch 1309 may be used to detect the neutral position of the power-steering cylinder. The steering angle during the steering of each wheel corresponds to a different displacement point of the piston in the power-steering cylinder. The position of the piston in the cylinder when the power-steering cylinder is in the neutral position is used as a neutral detection point, and the neutral detection point of the power-steering cylinder corresponding to each wheel is different. The neutral position of the power-steering cylinder will be designed in the design process of the cylinder.

For example, one position detecting switch may be provided on either side of the neutral detection point of the power-steering cylinder. The position detecting switch may be configured to detect whether the piston is on the left or the right of the position detecting switch during the implementation of automatically returning the power-steering cylinder to the neutral position by pressing one key, so as to achieve the purpose of making the wheel turn left or turn right to return to a neutral position. The wheel returning to (or in) the neutral position refers to the steering angle of the wheel is zero. The position detecting switch may also detect whether the cylinder returns to the neutral position, thereby providing a reference for the implementation of automatically returning the power-steering cylinder to the neutral position by pressing one key.

The present application also provides a new four-wheel positioning method for the electrically controlled steering axle. During the design, the power-steering cylinders are matching designed according to the neutral position of the wheel, and each power-steering cylinder corresponds to a designed neutral position. Whether the power-steering cylinder returns to the designed neutral position of is detected, and the detection signal is input to the steering controller. The steering controller may implement automatically returning the power-steering cylinder to the designed neutral position by pressing one key inside the cab according to the program set by itself. At this time, the wheel positioning device performs fine adjustment of the position of the piston in of the power-steering cylinder to achieve the purpose of adjusting the attitude of the tire. After the adjustment is completed, all the tires are in the designed neutral position, and the angle sensor inside the suspension cylinder may be implemented to zero by pressing one key by means of the steering controller inside the cab. By way of four-wheel positioning, the vehicle may be ensured to have a favorable travel performance and reliability.

For example, after the power-steering cylinder returns to the neutral position, it is possible start adjusting the parameters of the four-wheel positioning of the wheels. The fin adjustment of the position of the piston in the cylinder is implemented by adjusting the adjustable ball threads at the end of the cylinder rod of the cylinder, to obtain reasonable parameters for the attitudes of the tires. The four-wheel positioning device may use anyone of the existing devices for detecting the attitudes of the tires. After the four-wheel positioning is completed, all the tires are in the neutral position, but the angle sensor signal may not be at the zero position. At this time, the angle sensors may be zeroed by manual adjustment. Alternatively, in order to achieve the effect of saving time and effort, the angle sensors may be automatically zeroed by the control module of the cab, such that the display shows a zero value, and the controller considers the steering angles to be zero inside the system.

When the steering control system is malfunctioned, the vehicle may not be able to perform a steering operation, and thus the present application also provides an auxiliary emergency control system.

In one embodiment, the auxiliary emergency control system may comprise an auxiliary controller and an auxiliary hydraulic system. The auxiliary controller is electrically connected to the steering controller, for reading a signal of the steering controller, and transmitting an emergency electrical signal to an auxiliary hydraulic system when the steering controller is malfunctioned or a steering hydraulic system corresponding to the steering controller is malfunctioned. The auxiliary hydraulic system is configured to control an action of the power-steering cylinder of the steering device of a corresponding wheel by hydraulic oil when the emergency electrical signal is received, so that the wheel returns to a neutral position. The system may be started in the event of an alarm or malfunction in the main control system, such that the electrically controlled steering wheel returns to a preset neutral position.

In one embodiment, the auxiliary emergency control system may also include one or more position detecting switches. Each of the position detecting switches is disposed on the corresponding power-steering cylinder (for example, as described above, each of the position detecting switch is integrated together with the corresponding power-steering cylinder). The position detecting switch is used for detecting a position of a piston in the power-steering cylinder and transmitting the position of the piston to the auxiliary controller. The auxiliary controller when collecting that the power-steering cylinder returns to the neutral position of the power-steering cylinder according to the position of the piston determines that the corresponding wheel returns to the neutral position of the wheel, thereby ceasing control of an action of the power-steering cylinder (i.e. causing the power-steering cylinder to cease an action).

In one embodiment, the auxiliary emergency control system may also comprise one or more displacement sensors. Each of the displacement sensors is disposed on the power-steering cylinder (for example, the cylinder displacement sensor is integrated together with the power-steering cylinder), for detecting a displacement of the piston in the power-steering cylinder and transmitting the displacement to the auxiliary controller. The auxiliary controller when collecting that the power-steering cylinder returns to the neutral position power-steering cylinder according to the displacement determines that the corresponding wheel returns to the neutral position of the wheel, thereby ceasing control of an action of the power-steering cylinder (i.e. causing the power-steering cylinder to cease an action).

Figure 14:
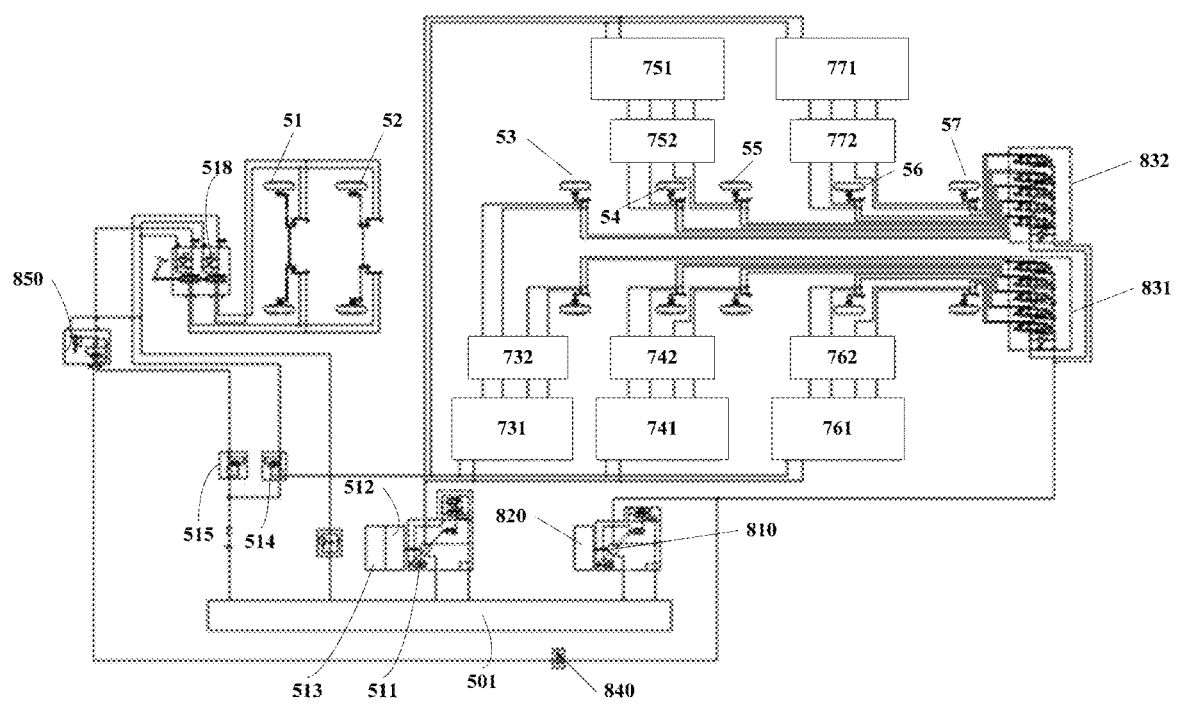
FIG. 14 is a schematic structural view schematically showing a hydraulic system according to one embodiment of the present application.

FIG. 14 is a schematic structural view schematically showing a hydraulic system according to one embodiment of the present application. In addition to the portions shown in FIG. 14, which are similar to the steering hydraulic system shown in FIG. 5. The difference lies in that the steering hydraulic system of FIG. 14 includes: a directional solenoid valve block 731 of the third axial, a latch valve block 732 of the third axle for locking one or more oil chambers, a directional solenoid valve block 741 of the fourth axle and the fifth axle on the left side, a latch valve block 742 of the fourth axle and the fifth axle for locking oil chambers on the left side, a directional solenoid valve block 751 of the fourth axle and the fifth axle on the right side, a latch valve block 752 of the fourth axle and the fifth axle for locking oil chambers on the right side, a directional solenoid valve block 761 of the sixth axle and the seventh axle on the left side, a latch valve block 762 of the sixth axle and the seventh axle for locking oil chambers on the left side, a directional solenoid valve block 771 of the sixth axle and the seventh axle on the right side, a latch valve block 772 of the sixth axle and the seventh axle for locking oil chambers on the right side, The auxiliary hydraulic system is also shown in FIG. 14. The auxiliary hydraulic system may include: a transfer case (which may rotate along with the operation of the vehicle) 820, an auxiliary emergency pump 810, and a plurality of auxiliary control solenoid valves (for example, FIG. 14 shows two sets of three-position and four-way auxiliary control solenoid valve blocks 831 and 832, which include the auxiliary control solenoid valves). The auxiliary emergency pump 810 is mounted on the transfer case 820 (specifically, the auxiliary emergency pump is mounted on the power take-off port of the transfer case). The auxiliary emergency pump is connected to the hydraulic oil tank 501 through an oil passage, and connected to a plurality of auxiliary control solenoid valves through oil passages. Each of the auxiliary control solenoid valves is respectively connected to the large chamber and the small chamber of the corresponding power steering cylinder through an oil passage. For example, the auxiliary control solenoid valve on the left side of the third axle is connected to the large chamber and the small chamber of the power-steering cylinder corresponding to the third axle, similar to others. The auxiliary controller (not shown in FIG. 14) is electrically connected to the plurality of auxiliary control solenoid valves. The auxiliary controller transmits the emergency electrical signal to each of the auxiliary control solenoid valves to control conduction of each of the auxiliary control solenoid valves, thereby controlling an action of the corresponding power-steering cylinder, such that the corresponding wheel returns to the neutral position of the wheel. For example, the auxiliary controller transmits the emergency electrical signal to the auxiliary control solenoid valve on the left side of the third axle to control conduction of the auxiliary control solenoid valve on the left side of the third axle, thereby controlling an action of the power-steering cylinder corresponding to the third axle, to control the left wheel of the third axle to return to the neutral position of the left wheel.

In the above embodiment, the power source of the auxiliary emergency control system comes from an auxiliary emergency pump mounted on the power take-off port of the transfer case, where two sets of three-position and four-way auxiliary control solenoid valve blocks are added between the auxiliary emergency pump and the power-steering cylinders on the left and right sides of the electrically controlled steering axles such as the third, fourth, fifth, sixth and seventh axles, to respectively control the power-steering cylinders on the left and right sides of the electrically controlled axles. Each of the solenoid valves is controlled by a separate auxiliary controller which reads an actual signal of a controller that controls the steering of the electrically controlled axles (i.e., the steering controller). When the controller that controls the steering of the electrically controlled axles is malfunctioned or a certain hydraulic circuit fails, the auxiliary controller controls the on-off of the auxiliary control solenoid valve of the circuit that fails, to effectuate that the power-steering cylinder controlled by the circuit returns to the neutral position of the power-steering cylinder, i.e. effectuating the wheel to return the neutral position of the wheel, and ensure the safety of the vehicle.

In one embodiment, as shown in FIG. 14, the auxiliary hydraulic system further includes: one or more on-off solenoid valves 840 and one or more priority valves 850. Each of the on-off solenoid valves 840 is electrically connected to the auxiliary controller (not shown in FIG. 14). Each of the on-off solenoid valves 840 is connected to the auxiliary emergency pump 810 through an oil passage, and connected to one of the priority valves 850 through an oil passage. Each of the priority valves 850 is connected to the steering hydraulic system corresponding to the mechanical steering axles through an oil passage. When a certain electrically controlled steering axle of the vehicle is malfunctioned, the auxiliary controller transmits a conduction signal to the on-off solenoid valves 840 and the priority valves 850, and controls conduction of the on-off solenoid valves 840 and the priority valves 850, thereby controlling steering of the wheel corresponding to the mechanical steering axles. In this embodiment, when the electrically controlled steering axle is malfunctioned, the electrically controlled steering axle is locked, and the steering by mechanical operation is realized by the on-off solenoid valves and the priority valves here.

Figure 15:
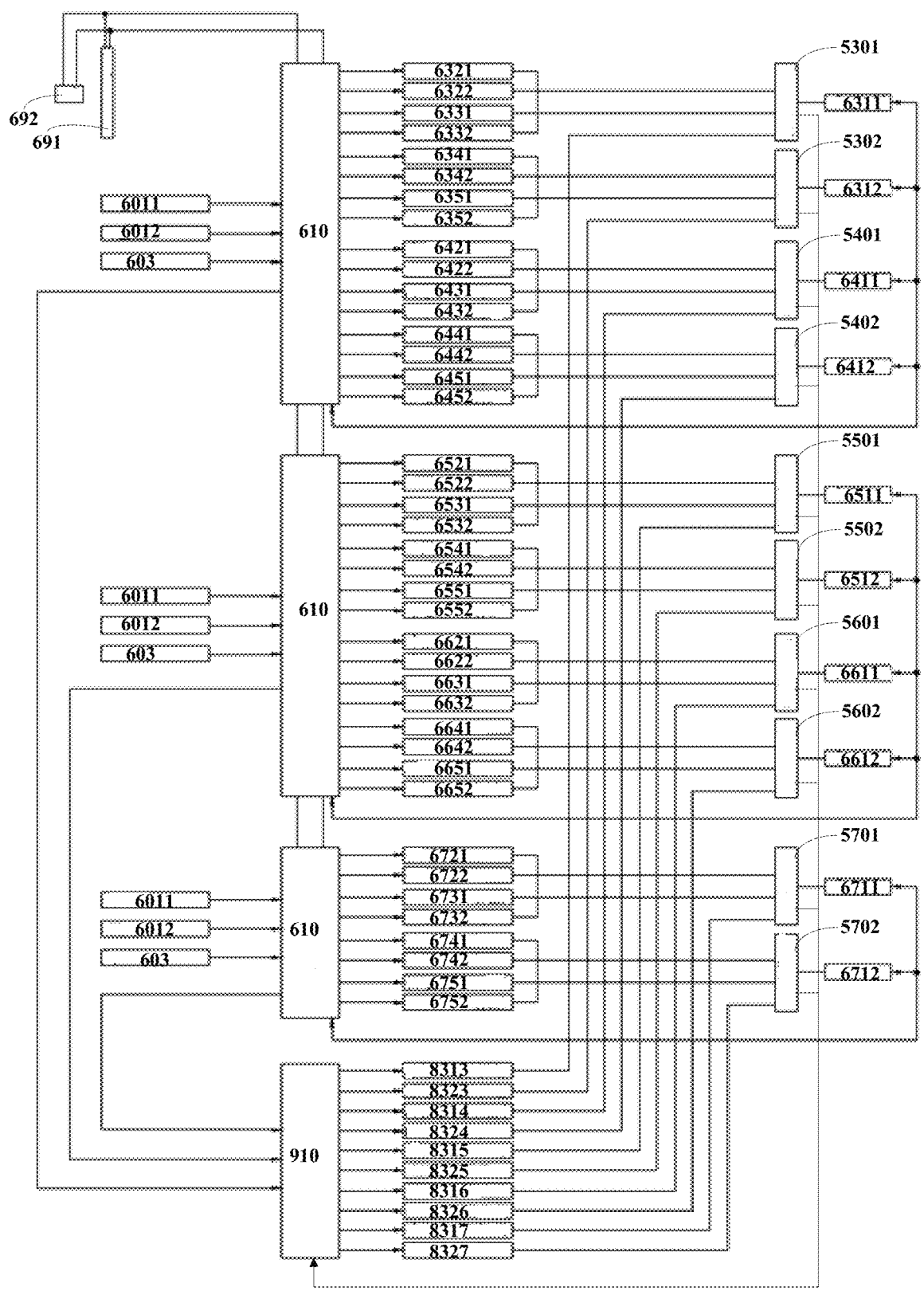
FIG. 15 is a schematic structural view schematically showing a control system according to one embodiment of the present application.

FIG. 15 is a schematic structural view schematically showing a control system according to one embodiment of the present application. FIG. 15 shows a structure that is the same as or similar to the steering system in FIG. 6. In addition, an auxiliary controller 910 and a plurality of auxiliary control solenoid valves are also shown in FIG. 15. The plurality of auxiliary control solenoid valves are respectively: an auxiliary solenoid valve 8313 connected to the left cylinder of the third axle, an auxiliary solenoid valve 8323 connected to the right cylinder of the third axle, an auxiliary solenoid valve 8314 connected to the left cylinder of the fourth axle, an auxiliary solenoid valve 8324 connected to the right cylinder of the fourth axle, an auxiliary solenoid valve 8315 connected to the left cylinder of the fifth axle, an auxiliary solenoid valve 8325 connected to the right cylinder of the fifth axle, an auxiliary solenoid valve 8316 connected to the left cylinder of the sixth axle, an auxiliary solenoid valve 8326 connected to the right cylinder of the sixth axle, an auxiliary solenoid valve 8317 connected to the left cylinder of the seventh axle, an auxiliary solenoid valve 8327 connected to the right cylinder of the seventh axle.

Taking auxiliary solenoid valve 8313 connected to the left cylinder of the third axle as an example, the control process of the auxiliary emergency control system is described as follows: when the steering controller 610 is malfunctioned or the steering hydraulic system corresponding to the steering controller 610 fails, the steering controller 610 transmits a signal (which may be referred to as a fault signal) to the auxiliary controller 910. The auxiliary controller 910 after acquiring the signal transmits an emergency electric signal to the auxiliary hydraulic system. For example, currently it is necessary to control the left wheel of the third axle to return to the neutral position of the left wheel, an emergency electrical signal is transmitted to the auxiliary solenoid valve 8313, to control the conduction of the auxiliary solenoid valve 8313, so as to control an action of the power-steering cylinder on the left side of the third axle, such that the power-steering cylinder on the left side of the third axle is steered. Moreover, the position detecting switch disposed on the power-steering cylinder on the left side of the third axle obtains the position of the piston of the power-steering cylinder in real time and feeds it back to the auxiliary controller 910. The auxiliary controller 910 ceases the control of the action of the power-steering cylinder when the auxiliary controller 910 determines that the power-steering cylinder returns to the neutral position according to the position of the piston (also that is, the left wheel on the third axle returns to the neutral position of the wheel). The control processes of other auxiliary solenoid valves are similar, and will not be repeated here.

In addition, the foregoing describes a steering operation after locking the electrically controlled steering axles. Here, a steering operation in which the electrically controlled steering axles are not locked will be further described. In one embodiment, the auxiliary controller after receiving (for example from the displacement sensor) the displacement (of the piston in the power-steering cylinder) calculates a current steering angle of the wheel according to the displacement, and controls the steering of the wheel in conjunction with the current steering angle when the steering control system of the vehicle is malfunctioned. For example, in this process, at least one of the first steering angles of the wheels corresponding to the mechanical steering axles collected by the first angle sensors described above is also input to the auxiliary controller which may obtain a theoretical steering angle of the corresponding wheel according to the first steering angles, and control the steering of the corresponding wheel according to a difference between the current steering angle calculated in the foregoing and the theoretical steering angle here, until the difference therebetween is within a preset range.

The present application further provides a crane comprising the steering control system as previously described.

In one embodiment, the crane may further comprise the auxiliary emergency control system as previously described.

Figure 16:
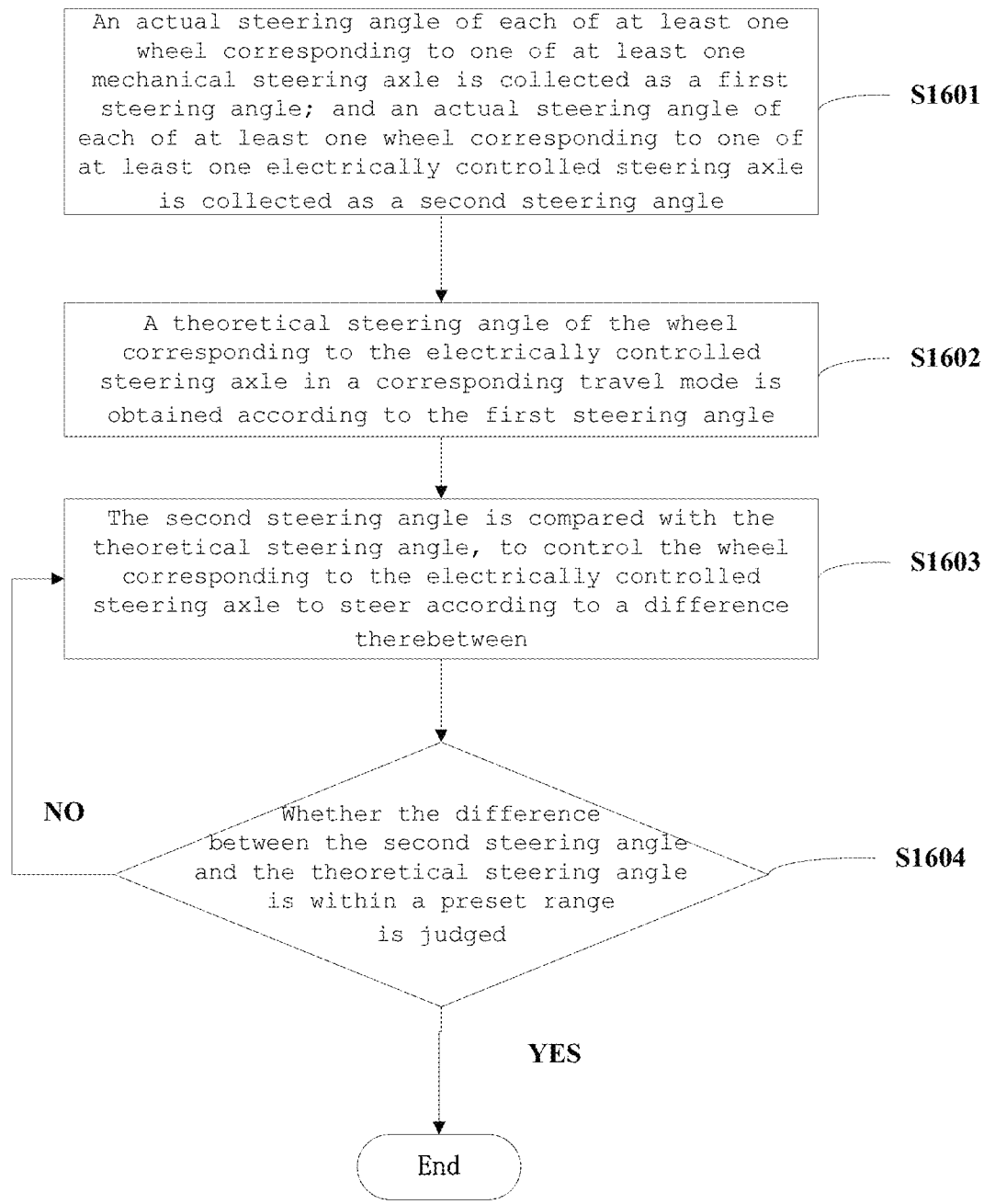
FIG. 16 is a flow chart showing a steering control method according to one embodiment of the present application.

FIG. 16 is a flow chart showing a steering control method according to one embodiment of the present application.

At step S1601, an actual steering angle of each of at least one wheel corresponding to one of at least one mechanical steering axle is collected as a first steering angle; and an actual steering angle of each of at least one wheel corresponding to one of at least one electrically controlled steering axle is collected as a second steering angle. For each of the wheel, the following steps S1602~S1604 are executed.

At step S1602, a theoretical steering angle of the wheel corresponding to the electrically controlled steering axle in a corresponding travel mode is obtained according to the first steering angle.

At step S1603, the second steering angle is compared with the theoretical steering angle, to control the wheel corresponding to the electrically controlled steering axle to steer according to a difference therebetween.

At step S1604, whether the difference between the second steering angle and the theoretical steering angle is within a preset range is judged. If YES, end the process. If NO, return to step S1603, i.e. the steering of the corresponding wheel is further controlled.

In this embodiment, the first steering angles and the second steering angles are collected, and then the theoretical steering angle of a wheel corresponding to the electrically controlled steering axle in a corresponding travel mode is obtained according to the first steering angles, and the second steering angle of the wheel is compared with the theoretical steering angle, to control the wheel corresponding to the electrically controlled steering axle according to a difference therebetween, until the difference between the second steering angle and the theoretical steering angle is within a preset range, thereby realizing the control of the wheel steering.

In one embodiment, the mechanical steering axles are independent mechanical axles, and the electrically controlled steering axles are independent electrically controlled axles. The steps of collecting the first steering angle and the second steering angle may include: collecting the first steering angles of the wheels on left and right sides of each of the independent mechanical axles and the second steering angles of the wheels on left and right sides of each of the independent electrically controlled axles. The step of controlling the wheel corresponding to the electrically controlled steering axle to steer may include: controlling each of the wheels on left and right sides of the independent electrically controlled axle to steer according to the first steering angle and the second steering angle of each of the wheels on left and right sides respectively.

In one embodiment, the step of obtaining the theoretical steering angle may include: calculating the theoretical steering angle of the wheel corresponding to the electrically controlled steering axle in a corresponding travel mode according to Ackerman's theorem. The travel mode may include: a normal road travel mode, a small turning travel mode, a crab-like travel mode, a tail slide preventing travel mode, a rear axle independent steering travel mode, or a rear axle locking travel mode.

In one embodiment, the at least one wheel corresponding to one of at least one mechanical steering axle may include: first wheels corresponding to the first mechanical steering axle and second wheels corresponding to the second mechanical steering axle. In one embodiment, the at least one wheel corresponding to one of at least one electrically controlled steering axle may include: third wheels corresponding to the third electrically controlled steering axle, fourth wheels corresponding to the fourth electrically controlled steering axle, and fifth wheels corresponding to the fifth electrically controlled steering axle, and sixth wheels corresponding to the sixth electrically controlled steering axle and seventh wheels corresponding to the seventh electrically controlled steering axle.

In one embodiment, in the normal road travel mode, the steering directions of the fifth wheels, the sixth wheels, and the seventh wheels are opposite to those of the first wheels, the second wheels, and the third wheels and the fourth wheels, and the steering angles of the first wheels to the seventh wheels satisfy the Ackerman theorem.

In one embodiment, in the small turning travel mode, the steering directions of the fifth wheels, the sixth wheels, and the seventh wheels are opposite to the first wheels, the second wheels, and the third wheels and the fourth wheels, and the steering angles of the first wheels to the seventh wheels satisfy the Ackerman theorem.

In one embodiment, in the crab-like travel mode, the steering directions of the first wheels to the seventh wheels are the same, and the steering angles of the first wheels and the second wheels satisfy the Ackerman theorem.

In one embodiment, in the tail slide preventing travel mode, the steering direction of the seventh wheels are opposite to the steering directions of the first wheels, the second wheels, the third wheels, and the fourth wheels, the fifth wheels and the sixth wheels do not take part in steering, and the steering angles of the first wheels, the second wheels, the third wheels, the fourth wheels, and the seventh wheels satisfy the Ackermann theorem.

In one embodiment, in the rear axle independent steering travel mode, the steering directions of the fifth wheels, the sixth wheels, and the seventh wheels are opposite to those of the third wheels and the fourth wheels, the first wheels and the second wheels do not take part in steering, and the steering angles of the third wheels to the seventh wheels satisfy the Ackerman theorem. In one embodiment, the step of obtaining the theoretical steering angle may include: obtaining a rotation angle of a knob of the vehicle and a vertical distance from the knob to the axis passing through the steering center O and perpendicular to the traveling direction of the vehicle; and calculating the theoretical steering angle of each of the third wheels to the seventh wheels in conjunction with the rotation angle of the knob and the vertical distance.

In one embodiment, in the rear axle locking travel mode, the third wheels to the seventh wheels do not take part in steering, and the steering angles of the first wheels and the second wheels satisfy the Ackerman theorem.

In one embodiment, the first steering angles may include: steering angle of the first wheels and steering angles of the second wheels. The step of obtaining the theoretical steering angle includes: determining whether the steering angles of the first wheels are correct according to an Ackerman theorem relationship between the steering angles of the first wheels and the steering angles of the second wheels as well as the steering angles of the second wheels; and calculating the theoretical steering angle of the wheel corresponding to the electrically controlled steering axle in the corresponding travel mode according to at least one of the steering angles of the first wheels if the steering angles of the first wheels are correct.

In one embodiment, for each wheel corresponding to one of the at least one electrically controlled steering axle, the step of controlling the wheel corresponding to the electrically controlled steering axle to steer according to a difference therebetween may include: transmitting a steering electrical signal to a steering hydraulic system according to the difference between the second steering angle and the theoretical steering angle; and controlling an action of a corresponding steering means of the wheel by hydraulic oil so as to control the wheel corresponding to the electrically controlled steering axle to steer after the steering hydraulic system receives the steering electrical signal.

In one embodiment, the steering control method may further comprise: obtaining a vehicle speed; and adjusting a steering angle of the wheel corresponding to the electrically controlled steering axle in conjunction with the vehicle speed.

In one embodiment, the steering control method may further comprise: detecting a position of a piston in a power-steering cylinder; and determining whether the power-steering cylinder is in a neutral position according to the position of the piston, and controlling a movement of the piston when the steering cylinder is not in the neutral position, such that the power-steering cylinder is in the neutral position. The power-steering cylinder in (or returns to) the neutral position refers to that the steering angle of the corresponding wheel is zero.

In one embodiment, the steering control method may further comprise: for each power-steering cylinder, locking a position of the piston after the power-steering cylinder is in the neutral position; adjusting positioning parameters of the corresponding wheel; and performing an automatic zeroing operation of the collected first steering angles and the corresponding second steering angle.

Figure 17:
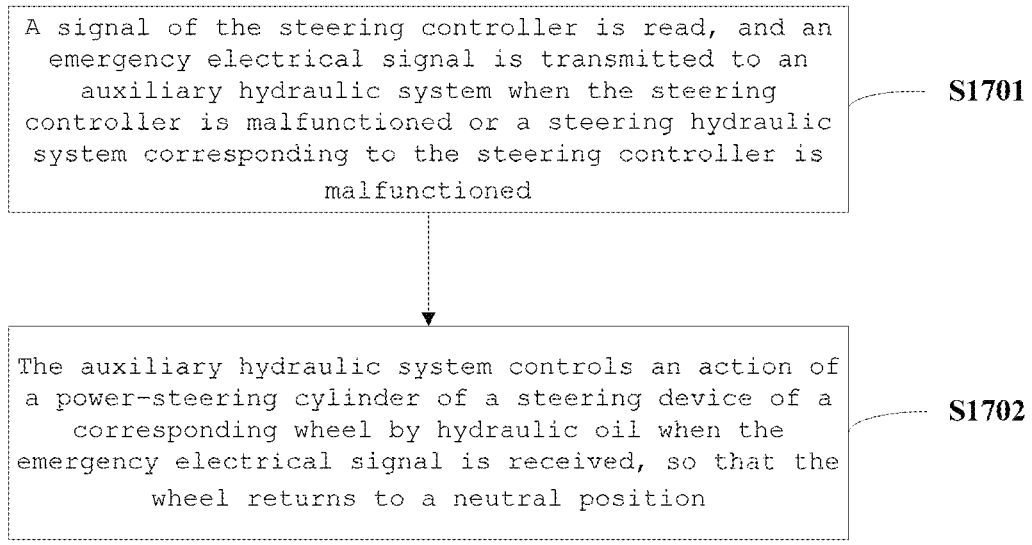
FIG. 17 is a flowchart showing an auxiliary emergency control method according to the present application.

FIG. 17 is a flowchart showing an auxiliary emergency control method according to the present application.

At step S1701, a signal of the steering controller is read, and an emergency electrical signal is transmitted to an auxiliary hydraulic system when the steering controller is malfunctioned or a steering hydraulic system corresponding to the steering controller is malfunctioned.

At step S1702, the auxiliary hydraulic system controls an action of a power-steering cylinder of a steering device of a corresponding wheel by hydraulic oil when the emergency electrical signal is received, so that the wheel returns to a neutral position. The wheel returning to (or in) the neutral position refers to that the steering angle of the wheel is zero.

The above embodiment implements an auxiliary emergency control method when the steering control system is malfunctioned, thereby returning the wheels of the electrically controlled steering axles to a preset neutral position.

In one embodiment, the auxiliary emergency control method may further comprise: obtaining a position of a piston in the power-steering cylinder; and when collecting that the power-steering cylinder returns to the neutral position of the power-steering cylinder according to the position of the piston determines that the wheel returns to the neutral position of the wheel, thereby ceasing control of an action of the power-steering cylinder (i.e. causing the power-steering cylinder to cease an action).

In one embodiment, the auxiliary emergency control method may further comprise: obtaining a displacement of the piston in the power-steering cylinder; and when collecting that the power-steering cylinder returns to the neutral position of the power-steering cylinder according to the displacement determines that the wheel returns to the neutral position of the wheel, thereby ceasing control of an action of the power-steering cylinder (i.e. causing the power-steering cylinder to cease the action).

In one embodiment, the auxiliary emergency control method may further comprise: when an electrically controlled steering axle of the vehicle is malfunctioned, transmitting a conduction signal to one or more on-off solenoid valves and one or more priority valves, and controlling conduction of the on-off solenoid valves and the priority valves, thereby controlling steering of the wheels corresponding to mechanical steering axles.

In one embodiment, the auxiliary emergency control method may further comprise: after receiving the displacement of the piston in the power-steering cylinder, calculating a current steering angle of the corresponding wheel according to the displacement, and controlling the steering of the wheel in conjunction with the current steering angle when the steering control system of the vehicle is malfunctioned.

The present application is applicable not only to an independent suspension axle, but also to an integral axle. The independent suspension axle is such an axle that: there is absent with a rigid beam or a non-disconnected axle connection between the left and right wheels. The left and right wheels are "independently" connected to the frame or body or constitute a disconnected axle respectively. The integral axle is such an axle that: the wheels on both sides are connected by an integral structural member, and the wheels together with the axles are suspended by the elastic suspension on the frame, and the left and right wheels when jumping are affected by each other.

The present application has at least one of the following advantages:

1. The steering device of the present application which may be applied to a chassis of a construction machinery vehicle, may significantly reduce the weight of the components in the steering system of the vehicle, and makes a significant contribution to the lightweight design of the whole vehicle.

2. The present application may implement the new suspension cylinder which may detect the displacement of the piston in the suspension cylinder and may also detect the steering angle of the corresponding tire, and may also implement the new suspension cylinder which may separately detect the steering angle of the corresponding tire. The suspension cylinder of the present application effectuates detecting the rotation motion between the cylinder barrel and the cylinder rod by means of the angle sensor, and may directly acquire the steering angle of the tire, thereby solving the problem that indirect acquisition of the steering angle of the tire leads to poor precision.

3. It is possible to realize independent control of the wheels on the left and right sides of the independent suspension axle, and significantly reduce the occurrence of abnormal tire wear when operation is shifted in multiple steering modes of the construction machinery vehicle.

4. The new solution for four-wheel positioning of the construction machinery vehicle is realized, and the positional parameters of the single tire are independently adjusted. The positioning and adjusting method is simple and reliable.

5. The auxiliary emergency system may be started in the event of an alarm or malfunction in the main control system, such that the wheel correspond to the electrically controlled steering axle returns to the preset neutral position.

Heretofore, the present application has been described in detail. Some details well known in the art are not described to avoid obscuring the concept of the present application. According to the above description, those skilled in the art would fully know how to implement the technical solutions disclosed herein.

The method and system of the present application may be implemented in many manners. For example, the method and system of the present application may be implemented by software, hardware, firmware, or any combination of a software, hardware, and firmware. The above-described sequence of steps for the method is for illustrative purposes only, and the steps of the method of the present application are not limited to the sequence specifically described above unless otherwise specifically stated. Moreover, in some embodiments, the present application may also be embodied as programs recorded in a recording medium, which include machine readable instructions for implementing the method according to the present application. Thus, the present application also covers recording medium storing programs for performing the method according to the present application.

Although some specific embodiments of the present application have been described in detail by way of examples, those skilled in the art should understand that the above examples are only for the purpose of illustration and are not intended to limit the scope of the present application. It should be understood by those skilled in the art that modifications to the above embodiments may be made without departing from the scope and spirit of the present application. The scope of the present application is limited by the appended claims.

What is claimed is:

1. A steering control system, comprising:
one or more first angle sensors, one or more second angle sensors, and a steering controller;
wherein the one or more first angle sensors and the one or more second angle sensors—are respectively electrically connected to the steering controller;
each of the one or more first angle sensors—collects an actual steering angle of a wheel corresponding to one of at least one mechanical steering axle as a first steering angle, and transmits the first steering angle to the steering controller;
each of the one or more second angle sensors—collects an actual steering angle of a wheel corresponding to one of at least one electrically controlled steering axle as a second steering angle, and transmits the second steering angle to the steering controller;
the steering controller obtains a theoretical steering angle of the wheel corresponding to the electrically controlled steering axle in a corresponding travel mode according to the first steering angle, and compares the second steering angle with the theoretical steering angle, to control the wheel corresponding to the electrically controlled steering axle to steer according to a difference therebetween, until the difference between the second steering angle and the theoretical steering angle is within a preset range;
wherein each of the one or more first angle sensors is mounted on a first suspension cylinder corresponding to the one of the at least one mechanical steering axle, and each of the second angle sensors is mounted on a second suspension cylinder corresponding to one of the at least one electrically controlled steering axle;
each of the one or more first angle sensors is integrated together with the first suspension cylinder, and each of the one or more second angle sensors is integrated together with the second suspension cylinder;
wherein each of the one or more first angle sensors comprises a first rotary portion directly connected to a cylinder barrel of the corresponding first suspension cylinder and a first fixing portion directly connected to a connecting rod of the corresponding first suspension cylinder;
each of the one or more second angle sensor comprises a second rotary portion directly connected to a cylinder barrel of the corresponding second suspension cylinder and a second fixing portion directly connected to a connecting rod of the corresponding second suspension cylinder.

2. The steering control system according to claim 1, wherein,
the at least one mechanical steering axle is an independent mechanical axle, and the at least one electrically controlled steering axle is an independent electrically controlled axle;
each of a portion of the one or more first angle sensors is mounted respectively on a suspension cylinder on the left side of the independent mechanical axle to collect the first steering angle on the left side, each of another portion of the one or more first angle sensors is mounted respectively on a suspension cylinder on the right side of the independent mechanical axle to collect the first steering angle on the right side, and each of a portion of the one or more second angle sensors is mounted respectively on a suspension cylinder on the left side of the independent mechanical axle to collect the second steering angle on the left side and each of another portion of the one or more second angle sensors is mounted respectively on a suspension cylinder on the right side of the independent electrically controlled axle to collect the second steering angle on the right side;
wherein the steering controller obtains the theoretical steering angle of the wheel on the left side of the electrically controlled steering axle in the corresponding travel mode according to the first steering angle on the left side, and compares the second steering angle with the theoretical steering angle of the wheel on the left side of the electrically controlled steering axle, to control the wheel on the left side of the electrically controlled steering axle to steer, and obtains the theoretical steering angle of the wheel on the right side of the electrically controlled steering axle in the corresponding travel mode according to the first steering angle on the right side, and compares the second steering angle with the theoretical steering angle of the wheel on the right side of the electrically controlled steering axle to control the wheel on the right side of the electrically controlled steering axle to steer.

3. The steering control system according to claim 1, wherein,
the steering controller calculates the theoretical steering angle of the wheel corresponding to the electrically controlled steering axle in the corresponding travel mode according to Ackerman's theorem;
wherein the corresponding travel mode comprises: a normal road travel mode, a small turning travel mode, a crab-like travel mode, a tail slide preventing travel mode, a rear axle independent steering travel mode, or a rear axle locking travel mode.

4. The steering control system according to claim 1, wherein,
the at least one mechanical steering axle comprises: a first mechanical steering axle and a second mechanical steering axle;
one of the one or more first angle sensors collects the first steering angle of a first wheel connected to the first mechanical steering axle, and another one of the one or more first angle sensors collects the first steering angle of a second wheel connected to the second mechanical steering axle;
wherein the steering controller determines whether the first steering angle of the first wheel is correct according to an Ackerman theorem relationship between the first steering angle of the first wheel and the first steering angle of the second wheel as well as the first steering angle of the second wheel, and calculates the theoretical steering angle of the wheel corresponding to the electrically controlled steering axle in the corresponding travel mode according to the first steering angle of the first wheel if the first steering angle of the first wheel is correct.

5. The steering control system according to claim 1, further comprising:
a vehicle speed detecting device for obtaining a vehicle speed and transmitting the vehicle speed to the steering controller, wherein the steering controller adjusts the actual steering angle of the wheel corresponding to the electrically controlled steering axle in conjunction with the vehicle speed.

6. A crane, comprising: the steering control system according to claim 1.

7. The steering control system according to claim 1, further comprising:
- a steering hydraulic system for controlling an action of a steering device of the wheel corresponding to the electrically controlled steering axle by hydraulic oil after receiving a steering electrical signal of the steering controller, thereby controlling the wheel corresponding to the electrically controlled steering axle to steer;
- wherein the steering controller transmits the steering electrical signal to the steering hydraulic system according to the difference between the second steering angle and the theoretical steering angle.

8. The steering control system according to claim 7, wherein,
- the steering hydraulic system comprises: a hydraulic pump, a hydraulic oil tank, at least one directional solenoid valve block, and at least one oil chamber locking valve block;
- wherein the steering controller is electrically connected to the at least one directional solenoid valve block and the at least one oil chamber locking valve block respectively, wherein each of the at least one directional solenoid valve block is respectively connected to the hydraulic pump, the hydraulic oil tank, and a corresponding oil chamber locking valve block through an oil passage, wherein the hydraulic pump is connected to the hydraulic oil tank through an oil passage, and wherein each of the at least one oil chamber locking valve block is connected to an oil chamber of a power-steering cylinder of the steering device through an oil passage;
- the steering controller transmits the steering electrical signal to a corresponding directional solenoid valve block and the corresponding oil chamber locking valve block according to the difference between the second steering angle and the theoretical steering angle respectively, so that the oil passage of the corresponding directional solenoid valve block communicates with oil passage of the corresponding oil chamber locking valve block, thereby controlling a projecting or retracting action of the power-steering cylinder, to control the corresponding wheel to steer.

9. The steering control system according to claim 7, wherein, the steering device comprises: a knuckle arm and a power-steering cylinder;
- wherein the knuckle arm is located between a suspension cylinder and an axle rim;
- the power-steering cylinder includes a first end connected to a frame bottom and a second end connected to the knuckle arm.

10. The steering control system according to claim 9, further comprising:
- at least one position detecting switch or at least one displacement sensor;
- each of the at least one position detecting switch disposed on the power-steering cylinder of the corresponding steering device, for detecting a position of a piston in the power-steering cylinder and transmitting the position of the piston to the steering controller; wherein the steering controller determines whether the power-steering cylinder is in a neutral position according to the position of the piston, and controls movement of the piston when the power-steering cylinder is not in the neutral position, such that the power-steering cylinder is in the neutral position;
- each of the at least one displacement sensor disposed on the power-steering cylinder of the corresponding steering device, for detecting a displacement of a piston in the power-steering cylinder and transmitting the displacement to the steering controller;
- wherein the steering controller determines whether the power-steering cylinder is in a neutral position according to the displacement, and controls movement of the piston when the steering cylinder is not in the neutral position, so that the power-steering cylinder is in the neutral position;
- wherein, the power-steering cylinder in the neutral position refers to that the actual steering angle of the corresponding wheel is zero.

11. The steering control system according to claim 10, wherein,
- the steering controller is further configured to lock a position of the piston after the power-steering cylinder is in the neutral position, and to perform an automatic zeroing operation of a corresponding first angle sensor and the corresponding second angle after adjusting positioning parameters of the corresponding wheel.

12. A steering control method, comprising:
- collecting an actual steering angle of each of at least one-wheel corresponding to one of at least one mechanical steering axle as a first steering angle by each of first angle sensors; and collecting an actual steering angle of each of at least one wheel corresponding to one of at least one electrically controlled steering axle as a second steering angle by each of second angle sensors; and
- obtaining a theoretical steering angle of the wheel corresponding to the electrically controlled steering axle in a corresponding travel mode according to the first steering angle, and comparing the second steering angle with the theoretical steering angle by a steering controller, to control the wheel corresponding to the electrically controlled steering axle to steer according to a difference therebetween until the difference between the second steering angle and the theoretical steering angle is within a preset range;
- wherein each of the first angle sensors is mounted on a first suspension cylinder corresponding to one of the at least one mechanical steering axle, and each of the second angle sensors is mounted on a second suspension cylinder corresponding to one of the at least one electrically controlled steering axle;
- each of the first angle sensors is integrated together with the first suspension cylinder, and each of the second angle sensors is integrated together with the second suspension cylinder;
- wherein each of the first angle sensors comprises a first rotary portion directly connected to a cylinder barrel of the corresponding first suspension cylinder and a first fixing portion directly connected to a connecting rod of the corresponding first suspension cylinder;
- each of the second angle sensor comprises a second rotary portion directly connected to a cylinder barrel of the corresponding second suspension cylinder and a second fixing portion directly connected to a connecting rod of the corresponding second suspension cylinder.

13. The method according to claim 12, wherein,
- the at least one mechanical steering axle is an independent mechanical axle, and the at least one electrically controlled steering axle is an independent electrically controlled axle;

the collecting the actual steering angle of each of the at least one wheel corresponding to the one of the at least one mechanical steering axle as the first steering angle; and collecting the actual steering angle of each of the at least one wheel corresponding to the one of the at least one electrically controlled steering axle as the second steering angle comprises: collecting the first steering angle of the wheel on each of the left side and the right side of the independent mechanical axle and the second steering angle of the wheel on each of the left side and the right side of the independent electrically controlled axle;

the obtaining the theoretical steering angle of the wheel corresponding to the electrically controlled steering axle in the corresponding travel mode according to the first steering angle, and comparing the second steering angle with the theoretical steering angle to control the wheel corresponding to the electrically controlled steering axle to steer comprises: obtaining the theoretical steering angle of the wheel on the left side of the electrically controlled steering axle in the corresponding travel mode according to the first steering angle of the wheel on the left side of the independent mechanical axle, and comparing the second steering angle with the theoretical steering angle of the wheel on the left side of the electrically controlled steering axle, to control the wheel on the left side of the electrically controlled steering axle to steer; and obtaining the theoretical steering angle of the wheel on the right side of the electrically controlled steering axle in the corresponding travel mode according to the first steering angle of the wheel on the right side of the independent mechanical axle, and comparing the second steering angle with the theoretical steering angle of the wheel on the right side of the electrically controlled steering axle, to control the wheel on the right side of the electrically controlled steering axle to steer.

14. The method according to claim 12, wherein, the obtaining the theoretical steering angle of the wheel corresponding to the electrically controlled steering axle in a corresponding travel mode comprises:

calculating the theoretical steering angle of the wheel corresponding to the electrically controlled steering axle in a corresponding travel mode according to Ackerman's theorem;

wherein the corresponding travel mode includes: at least one of a normal road travel mode, a small turning travel mode, a crab-like travel mode, a tail slide preventing travel mode, a rear axle independent steering travel mode, or a rear axle locking travel mode.

15. The method according to claim 12, wherein, the controlling the wheel corresponding to the electrically controlled steering axle to steer according to a difference therebetween comprises:

transmitting a steering electrical signal to a steering hydraulic system according to the difference between the second steering angle and the theoretical steering angle; and controlling an action of a steering means of the wheel corresponding to the electrically controlled steering axle by hydraulic oil so as to control the wheel corresponding to the electrically controlled steering axle to steer after the steering hydraulic system receives the steering electrical signal.

16. The method according to claim 12, further comprising:

obtaining a vehicle speed; and adjusting a steering angle of the wheel corresponding to the electrically controlled steering axle in conjunction with the vehicle speed.

17. The method according to claim 12, further comprising:

detecting a position of a piston in a power-steering cylinder; and determining whether the power-steering cylinder is in a neutral position according to the position of the piston, and controlling a movement of the piston when the steering cylinder is not in the neutral position, such that the power-steering cylinder is in the neutral position;

wherein, the power-steering cylinder in the neutral position refers to that the steering angle of the corresponding wheel is zero.

18. The method according to claim 17, further comprising:

locking a position of the piston after the power-steering cylinder is in the neutral position;

adjusting positioning parameters of the wheel corresponding to the power-steering cylinder; and performing an automatic zeroing operation of the collected first steering angle and the second steering angle.

* * * * *